United States Patent
Costa et al.

(10) Patent No.: US 12,177,501 B2
(45) Date of Patent: Dec. 24, 2024

(54) SYSTEMS AND METHODS FOR EDGE SERVER CONTENT DELIVERY

(71) Applicant: SHOPIFY INC., Ottawa (CA)

(72) Inventors: Juliano Julio Costa, Mont-Saint-Hilaire (CA); Maxwell Dayvson Da Silva, Brooklyn, NY (US); Christian Harden, Encino, CA (US); Scott Taylor, Brooklyn, NY (US); Charles Bryant King, Chapel Hill, NC (US); Jeremy Gayed, Paramus, NJ (US); Danilo Santos Teodoro, Goiânia (BR); Mark Da Costa, Vars (CA); William Joseph Brower, Charleston, NC (US); Cauê Haucke Porta Guerra, Ottawa (CA)

(73) Assignee: SHIPIFY INC., Ottawa (CA)

( * ) Notice: Subject to any disclaimer, the term of this patent is extended or adjusted under 35 U.S.C. 154(b) by 0 days.

(21) Appl. No.: 18/326,206

(22) Filed: May 31, 2023

(65) Prior Publication Data
US 2024/0340476 A1   Oct. 10, 2024

Related U.S. Application Data

(60) Provisional application No. 63/457,600, filed on Apr. 6, 2023.

(51) Int. Cl.
*H04N 21/2183* (2011.01)
*H04N 21/239* (2011.01)

(52) U.S. Cl.
CPC ..... *H04N 21/2393* (2013.01); *H04N 21/2183* (2013.01)

(58) Field of Classification Search
CPC .......... H04N 21/2393; H04N 21/7183; H04N 21/2407; H04N 21/2408; H04N 21/25; H04L 61/4591

(Continued)

(56) References Cited

U.S. PATENT DOCUMENTS 7,991,883 B1 * 8/2011 Streeter .................. H04L 69/40
                                                        709/224
10,936,462 B1 * 3/2021 Eardley ............... G06F 11/0772
(Continued)

FOREIGN PATENT DOCUMENTS

| AU | 2011268104 A1 * | 5/2013 | ............. G06Q 50/00 |
| CA | 2952970 C       | * 10/2023 | .......... H04L 61/1511 |
| CN | 115408151 A     | * 11/2022 | |

OTHER PUBLICATIONS

Varda, Kenton, "Introducing Cloudflare Workers: Run JavaScript Service Workers at the Edge", Sep. 29, 2017, retrieved from https://blog.cloudflare.com/introducing-cloudflare-workers/, last accessed online on May 30, 2023, 13 pages.

*Primary Examiner* — Khanh Q Dinh

(57) ABSTRACT

Content providers may wish to display different versions of content to different users, which may require different versions of the content to be deliverable. The assignment of a particular version of the content to a particular user may also need to persist over time for that particular user. It may be desirable that this functionality occurs at an edge server of a content delivery network, rather than at an origin server. In some embodiments, the edge server may receive a user request including a user identifier for content from a user device; identify an experiment key for the user request based at least in part on the user identifier, the experiment key associated with an experimental version of the content; and transmit an experiment fetch request including the experiment key to an edge cache to retrieve the experimental version of the content.

22 Claims, 13 Drawing Sheets

(58) Field of Classification Search
USPC .................... 709/220, 224, 225, 227, 228
See application file for complete search history.

(56) References Cited

U.S. PATENT DOCUMENTS

| | | | |
|---|---|---|---|
| 11,099,835 B1* | 8/2021 | Wall | G06F 8/61 |
| 11,222,298 B2* | 1/2022 | Abelow | G06Q 10/067 |
| 11,252,454 B2* | 2/2022 | Navali | H04N 21/23439 |
| 2002/0143933 A1* | 10/2002 | Hind | H04L 67/02 |
| | | | 709/224 |
| 2005/0010446 A1* | 1/2005 | Lash | G06Q 40/08 |
| | | | 705/2 |
| 2006/0143135 A1* | 6/2006 | Tucker | G06F 21/121 |
| | | | 705/59 |
| 2007/0078768 A1* | 4/2007 | Dawson | H04N 21/2743 |
| | | | 705/50 |
| 2007/0149174 A1* | 6/2007 | Torvinen | H04M 15/00 |
| | | | 455/412.1 |
| 2008/0119133 A1* | 5/2008 | Rao | H04L 67/55 |
| | | | 705/14.73 |
| 2012/0150644 A1* | 6/2012 | Shiely | G06Q 30/0623 |
| | | | 705/26.61 |
| 2012/0166312 A1* | 6/2012 | Rao | H04L 67/06 |
| | | | 705/26.61 |
| 2013/0198789 A1* | 8/2013 | Streeter | H04N 21/26208 |
| | | | 725/94 |
| 2013/0324040 A1* | 12/2013 | Iwasaki | H04B 5/00 |
| | | | 455/41.1 |
| 2016/0124839 A1* | 5/2016 | Mordo | G06F 11/3664 |
| | | | 717/124 |
| 2019/0196842 A1* | 6/2019 | Horikoshi | G06F 9/5055 |
| 2019/0239103 A1* | 8/2019 | Tang | H04W 72/53 |
| 2020/0150949 A1* | 5/2020 | Jewkes | G06F 8/77 |
| 2023/0290456 A1* | 9/2023 | Baror | G06F 21/6245 |

* cited by examiner

E-Commerce Platform | Search | JG John's Apparel / Jonny B. Good

- Home
- Orders
- Products
- Customers
- Reports
- Discounts
- Apps

SALES CHANNELS
- Online Store
- Mobile App

View all channels

Settings

Good afternoon, Jonny B..
Here's what's happening with your store today.

Today's total sales   Today's visits
$98.00                1

- Update your Platform Payments tax details
  We require additional information to verify your identity.
  [Update tax details]

- Advanced Cash on Delivery has been deactivated for your store
  [See why]

| All channels ˅ | Today ˅ |

TOTAL SALES
$98.00

$125
$75
$25

Jun 1
                                    2 orders

12am   8pm   4pm   11pm

TOTAL SALES BY CHANNEL    Jun 1

Online Store    View dashboard
$0.00           0 orders

Mobile app
$0.00           0 orders

Shopify POS (126 York St.)
$0.00           0 orders

FIG. 9

SYSTEMS AND METHODS FOR EDGE SERVER CONTENT DELIVERY

RELATED PATENTS AND/OR APPLICATIONS

This application claims the benefit of U.S. provisional application No. 63/457,600, titled "EDGE CACHE-AWARE CONTENT PLATFORM", filed on Apr. 6, 2023, and incorporated herein by reference.

FIELD

This application generally relates to content delivery over a network such as the internet.

BACKGROUND

Edge servers of a content delivery network (CDN) are servers located on a logical extreme of the CDN and are typically physically separate from an origin server. Edge servers are geographically dispersed to be closer to a user device when compared to the origin server, to reduce latency and load times when responding to a user request for content from the user device.

SUMMARY

Content provided to users over a network may include websites or web applications (webapps), computer applications, and/or mobile applications for example. Content providers that provide such content may wish to display different interfaces to, or modify functionality for, different users, which may require different versions of the content (such an experimental version A, an experimental version B and a control version for example) to be deliverable. In some situations, the content providers may wish to launch the modified interface or modified function slowly to users over time, or only display the modified interface or function to certain users based on geographical location or device type of user devices associated with the users; alternatively, content providers may wish to run experiments to determine which version of a particular content is better received by users. For such partitions or experiments to be successful, the assignment of a particular version of the content to a particular user may need to persist over time for a particular user. As such, assignment and delivery of a particular version of content to a particular user is performed at an origin server, rather than at the edge servers of the CDN. However, this can result in increased latency and response times as a user request from a user device, and a response back to the user device, may need to travel between the user device and the origin server; additionally, transmitting a large number of user requests to the origin server can also render the origin server vulnerable to distributed denial-of-service (DDoS) attacks.

In some embodiments herein, assignment of a particular version of content to a user device may be performed at an edge server. For example, the edge server may identify (e.g., assign) an experiment key for a user request, and transmit an experiment fetch request to an edge cache memory to retrieve an experimental version of the content that is associated with the experiment key. This may result in reduced latency and load times (since the user request and response need not travel between the edge server and origin server) and provide protection for the origin server against DDoS attacks (since not all user requests are transmitted to the origin server).

According to one embodiment, a computer-implemented method is provided. The computer-implemented method may include: receiving, by an edge server separate from an origin server, a user request for content from a user device, the user request including a user identifier associated with the user device; identifying by the edge server, an experiment key for the user request based at least in part on the user identifier, the experiment key associated with an experimental version of the content; and transmitting, by the edge server, an experiment fetch request to an edge cache to retrieve the experimental version of the content, the experiment fetch request providing the experiment key.

In some embodiments, the computer-implemented method may further involve: receiving, by the edge server, an indication that the experimental version of the content is not stored in the edge cache; and transmitting, by the edge server, the experiment fetch request to the origin server to retrieve the experimental version of the content from the origin server in response to the indication.

In some embodiments, the computer-implemented method may further include: receiving, by the edge server, the experimental version of the content from the origin server; storing, by the edge server, the experimental version of the content received from the origin server in the edge cache in association with the experiment key; and delivering, by the edge server, the experimental version of the content received from the origin server to the user device.

In some embodiments, the computer-implemented method may further include: receiving, by the edge server, an indication that the experimental version of the content cannot be retrieved from the origin server; and transmitting, by the edge server, a control fetch request to at least one of the origin server or the edge cache to retrieve a control version of the content.

In some embodiments, the computer-implemented method may further include: receiving, by the edge server, a stale indication that the experimental version of the content stored in the edge cache is an expired copy of the experimental version of the content; delivering, by the edge server, the expired copy of the experimental version of the content to the user device; and requesting, by the edge server, an active copy of the experimental version of the content from the origin server.

In some embodiments, the computer-implemented method may further include, in response to receiving the active copy of the experimental version of the content from the origin server, storing, by the edge server, the active copy of the experimental version of the content in the edge cache and in association with the experiment key.

In some embodiments, the computer-implemented method may further include: receiving, by the edge server, an indication that the experimental version of the content is not stored in the edge cache; and rendering, by the edge server, the experimental version of the content based on data stored in a database in response to the indication, wherein the database is separate from the origin server and in communication with the edge server.

In some embodiments, the computer-implemented method may further include: storing, by the edge server, the experimental version of the content rendered by the edge server in the edge cache and in association with the experiment key; and delivering, by the edge server, the experimental version of the content rendered by the edge server to the user device.

In some embodiments, the computer-implemented method may further include, in response to an indication that the experimental version of the content cannot be rendered at the edge server, transmitting, by the edge server, a control fetch request to at least one of the origin server or the edge cache to retrieve a control version of the content.

In some embodiments, the computer-implemented method may further include: receiving, by the edge server, a stale indication that the experimental version of the content stored in the edge cache is an expired copy of the experimental version of the content; delivering, by the edge server, the expired copy of the experimental version of the content to the user device; and rendering, by the edge server, an active copy of the experimental version of the content based on the data stored in the database.

In some embodiments, the computer-implemented method may further include, in response to rendering the active copy of the experimental version of the content, storing, by the edge server, the active copy of the experimental version of the content in the edge cache and in association with the experiment key.

In some embodiments, the computer-implemented method may further include: receiving, by the edge server, a hit indication that the experimental version of the content requested by the user request is stored in the edge cache and is an active copy of the experimental version of the content; and delivering, by the edge server, the active copy of the experimental version of the content to the user device.

In some embodiments, the edge cache may store a plurality of different experimental versions of the content, each experimental version of the plurality of different experimental versions of the content is associated with a respective different experiment key of a plurality of experiment keys. The experimental version of the content may include a first experimental version of the content of the plurality of different experimental versions of the content and the experiment key includes a first experiment key of the plurality of experiment keys.

In some embodiments, the edge cache may further store a control version of the content. The control version of the content may not be associated with any experiment key of the plurality of experiment keys.

In some embodiments, the user device may be a first user device, the user request may be a first user request, the user identifier may be a first user identifier, and the experiment fetch request may be a first experiment fetch request. The method may further include: identifying, by the edge server, a second experiment key for a second user request for the content from a second user device, wherein the second user request includes a second user identifier associated with the second user device; and transmitting, by the edge server, a second experiment fetch request including the second experiment key to the edge cache to retrieve a second experimental version of the content stored in the edge cache.

In some embodiments, the user device may be a first user device, the user request may be a first user request, and the user identifier may be a first user identifier. The method may further include: identifying, by the edge server, the experiment key for a second user request for the content from a second user device, wherein the second user request includes a second user identifier associated with the second user device; and transmitting, by the edge server, the experiment fetch request including the experiment key to the edge cache to retrieve the experimental version of the content for delivery to the second user device.

In some embodiments, the computer-implemented method may further include: storing, by the edge server, the user identifier in association with the experiment key; and delivering the experimental version of the content to the user device in response to at least one further instance of the user request for the content from the user device.

According to another embodiment, a system is provided. The system may include at least one processor of an edge processor separate from an origin server. The system may further include a memory storing processor-executable instructions that, when executed, cause the at least one processor to: receive a user request for content from a user device, the user request comprising a user identifier associated with the user device; identify an experiment key for the user request based at least in part on the user identifier, the experiment key associated with an experimental version of the content; and transmit an experiment fetch request to an edge cache to retrieve the experimental version of the content, the experiment fetch request providing the experiment key.

In some embodiments, the memory may further stores processor-executable instructions that, when executed, cause the at least one processor to: receive an indication that the experimental version of the content is not stored in the edge cache; and transmit the experiment fetch request to the origin server to retrieve the experimental version of the content from the origin server in response to the indication or render the experimental version of the content based on data stored in a database in response to the indication. The database may be separate from the origin server and in communication with the at least one processor.

In some embodiments, the memory may further store processor-executable instructions that, when executed, cause the at least one processor to: receive an indication that the experimental version of the content cannot be retrieved from the origin server or rendered by the at least one processor; and transmit a control fetch request to at least one of the origin server or the edge cache to retrieve a control version of the content.

In some embodiments, the edge cache may store a plurality of different experimental versions of the content, each experimental version of the plurality of different experimental versions of the content is associated with a respective different experiment key of a plurality of experiment keys. The experimental version of the content may include a first experimental version of the content of the plurality of different experimental versions of the content and the experiment key may include a first experiment key of the plurality of experiment keys.

In some embodiments, the edge cache may further store a control version of the content. The control version of the content may not be associated with any experiment key of the plurality of experiment keys.

According to another embodiment, there is provided a non-transitory computer-readable storage medium having stored thereon computer-executable instruction that, when executed, cause a computer of an edge processor separate from an origin processor to perform operations including: receiving a user request for content from a user device, the user request comprising a user identifier associated with the user device; identifying an experiment key for the user request based at least in part on the user identifier, the experiment key associated with an experimental version of the content; and transmitting an experiment fetch request to an edge cache to retrieve the experimental version of the content, the experiment fetch request providing the experiment key.

Other aspects and features of the present disclosure will become apparent to those ordinarily skilled in the art upon review of the following description of specific embodiments of the disclosure in conjunction with the accompanying figures.

BRIEF DESCRIPTION OF DRAWINGS

In drawings which illustrate embodiments:

FIG. 9 illustrates a home page of an administrator of the e-commerce platform of FIG. 8, according to one embodiment.

DETAILED DESCRIPTION

For illustrative purposes, specific example embodiments will now be explained in greater detail below in conjunction with the figures. In some of the embodiments below, examples are presented in the context of an e-commerce platform. However, the methods and systems disclosed herein are not limited to e-commerce and are instead applicable to any scenario in which it is desired to deliver different versions of a particular content to different user devices using an edge server.

Figure 1:
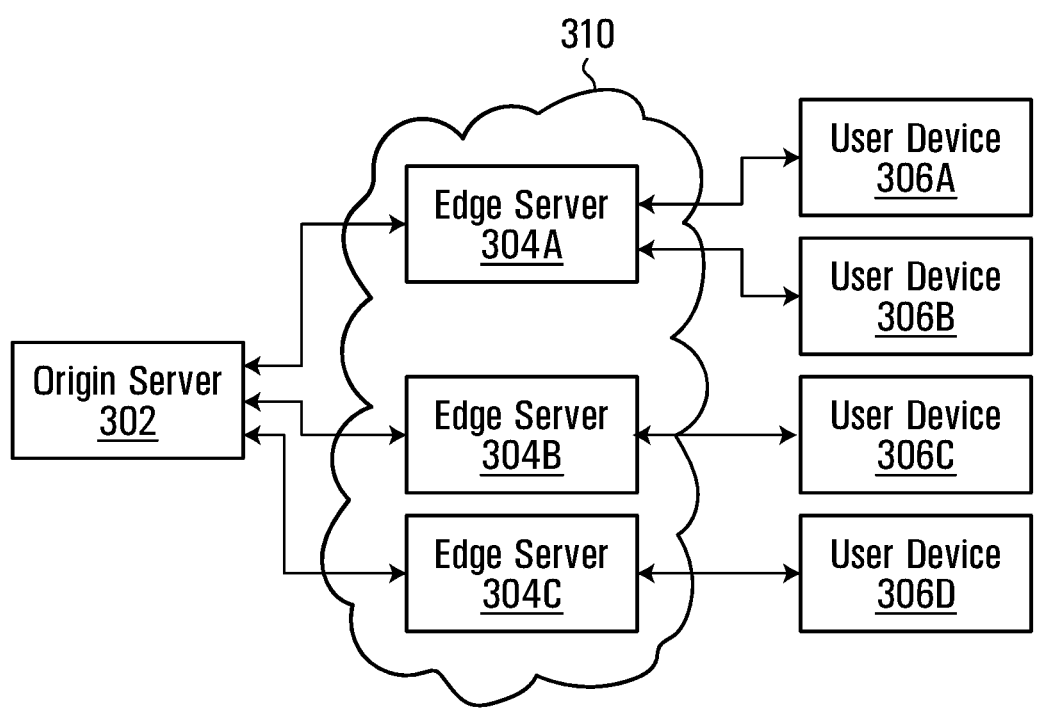
FIG. 1 is a block diagram of a system for delivering content including an origin server, a plurality of edge servers and a plurality of user device in accordance with one embodiment.

Referring to FIG. 1, a block diagram illustrating a system for delivering content in accordance with one embodiment is shown generally at 300. The system 300 includes an origin server 302, a plurality of edge servers 304A-304C, and a plurality of user devices 306A-306D. The origin server 302 and the plurality of edge servers 304A-304 may comprise any computer or program that provides services to other computers, programs, or user devices either in the same computer or over a network such as the internet. As non-limiting examples, the origin server 302 and the plurality of edge servers 304A-304C may be application, communication, mail, database, proxy, fax, file, media, web, peer-to-peer, standalone, software, or hardware servers (i.e., server computers) and may use any server format know to one of ordinary skill in the art.

The origin server 302 may host or store content provided by a single content provider or by multiple content providers. The expression "content" as used herein refers to any information which can be made available electronically to the plurality of user devices 306A-306D, and may include websites, webapps, computer applications, mobile applications, multimedia content such as image data, audio data and video data, etc. In the embodiment shown in FIG. 1, only a single origin server 302 is shown; in other embodiments, more than one origin server 302 may be used to host content provided by a particular content provider or by multiple content providers. Content hosted by the origin server 302 may be stored in the origin server 302 associated with a content identifier uniquely identifying the content. For example, the content identifier for a particular website or webapp may be a unique IP address or a human-readable unique resource locator (URL), and the content identifier for a particular image or video may be a unique IP address or a unique resource indicator (URI). The plurality of user devices 306A-306D may submit a user request to retrieve a particular content hosted on the origin server 302 by using the corresponding content identifier for that particular content. For example, to retrieve a particular website or webapp, the plurality of user devices 306A-306D may input the URL into an internet browser application running on the plurality of user devices 306A-306D.

The plurality of edge servers 304A-304C may communicate with the origin server 302 to distribute the content hosted by the origin server 302 to the plurality of user devices 306A-306D, and may be a part of a content delivery network (CDN) 310. The reference character "304" as used herein refers to any one of the plurality of edge server 304A-304C, or any other server "downstream" of the origin server 302 that may receive user requests from the plurality of user devices 306A-306D before the origin server 302. In the embodiment shown in FIG. 1, three edge servers 304A, 304B and 304C are shown; in other embodiments, a greater number or a fewer number of edge servers may be a part of the CDN 310 used to distribute content hosted by the origin server 302. The CDN 310 may be managed and maintained by a network provider separate from the content provider, and the network provider may charge the content provider a fee for use of the plurality of edge servers 304A-304C. The network provider may also impose limitations on use of the plurality of edge server 304A-304C, including, for example, one or more of data limits, name limits, read limits, etc. The plurality of edge servers 304A-304C may be a computing resource shared by a plurality of content providers.

User requests for content hosted by the origin server 302 originating from the plurality of user devices 306A-306D may initially be received at one of the plurality of edge servers 304A-304C rather than directly at the origin server 302. For example, IP addresses of content hosted by the origin server 302 may initially be advertised by the plurality of edge servers 304A-304C (e.g., via the Border Gate Protocol (BGP)). In some embodiments, the plurality of edge servers 304A-304C may be geographically remote from each other and also geographically remote from the origin server 302. For example, the origin server 302 may be located in North America, the edge server 304A may be located in Europe, the edge server 304B may be located in Asia and the edge server 304C may be located in Australia. The CDN 310 may include a geographical load balancer used to route requests from the plurality of user devices 306A-306D to different ones of the plurality of edge servers 304A-304C based on a geographical proximity. This can reduce latency and response times to users requests from the plurality of user device 306A-306D, as the user requests, and the responses to the user requests, may need to travel less distance. For example, user requests from the user devices 306A and 306B which may be located in Europe may be routed to the edge server 304A, user requests from the user device 306C which may be located in Asia may be routed to the edge server 304B, and user requests from the user device 306D which may be located in Australia may be routed to the server 304C.

Additionally, as described above, the plurality of edge servers 304A-304C may cache the content hosted by the origin server 302 directly at the edge server 304. Caching by the edge server 304 can further reduce latency and response times to user requests from the plurality of user device 306A-306D, as computational overhead and network traffic created by the edge server 304 further requesting and fetching content from the origin server 302 can eliminated. The plurality of edge servers 304A-304C may also protect the origin server 302 against DDoS attacks by caching content and by receiving the user requests on behalf of the origin server 302, as user requests from the plurality of user devices 306A-306D are not all transmitted to the origin server 302. The CDN 310 may also provide additional functionality at the edge server 304, such as website optimizations (e.g., asynchronous loading, image optimizations, mobile optimizations), routing, script processing, and/or protocol management (e.g., IPv4/v6 gateway) functionality. The script processing functionality may be an "edge worker" service hosted at the edge server 304. The edge worker service may allow the content provider to upload and execute certain codes, such as serverless JavaScript (js) or webassembly codes, directly at the edge server 304 and to perform certain functions directly on the edge server 304, often without needing to transmit such user requests back to the origin server 302. The functionality described above are examples only, and the CDN 310 may perform fewer, alternative, or additional functionality.

As noted above, the plurality of user devices 306A-306D may request particular content hosted by the origin server 302 by submitting user requests to the plurality of edge servers 304A-304C. Reference character "306" will be used herein as referring to any one of plurality of user devices 306A-306D, or any other user device. A user device 306 may be, for example, a mobile phone, or a tablet, or a laptop, or a personal computer, etc. A user device 306 may include a processor for performing the operations of the user device 306 (e.g., by executing instructions stored in a program memory of the user device 306), a network interface (e.g., a transmitter/receiver with an antenna or a network interface card or a port) for communicating with the origin server 302 and the plurality of edge servers 304A-304C and a user interface (e.g., keyboard, display, and/or touchscreen). A user device 306 is associated with a user and can be uniquely identified with a user identifier. For example, the user identifier for a particular user device 306 (and/or a user thereof) may be at least one of a unique IP address, a user ID, or a browser ID. A browser ID may be associated with the internet browser application of the user device 306 and may be a general browser fingerprint, such as a user-agent string, or a token, etc. A user ID may be a unique set of characters (e.g., alphanumeric characters) assigned to the user device 306 so that the user device 306 can be identified across multiple interactions with the CDN 310 and/or the origin server 302. The user ID may be any identifier used to uniquely identify the user device 306 (and/or a user thereof), and could correspond to, be, or include the IP address, the browser ID and/or some other identifier associated with the user device 306 (and/or a user thereof). The user identifier (being at least one of the IP address, the user ID, the browser ID or some other identifier) may be stored as a HTTP cookie associated with the user device 306 and may be carried in an HTTP header carried in the user requests transmitted between the user device 306, the plurality of edge servers 304A-304C and/or the origin server 302. The HTTP cookie may have been assigned to the user device 306 after an initial interaction with the CDN 310 and/or the origin server 302.

A particular user device 306 (and/or a user thereof) may also be associated with additional characteristics. For example, a user device 306 may be associated with a geolocation tag corresponding to a geographical location of the user device 306 on earth at a current time. The term "geographical location" as used herein may include, as non-limiting examples, a country, a state, a region of a country, a continent or a region of a continent. The user device 306 may also or instead be associated with device type tag(s) including any one, some or all of the following: an underlying operating system of the user device 306, an underlying CPU architecture of the user device 306, a device model of the user device 306, whether the user device 306 is a mobile device or prefers a "mobile" user experience, and/or a device model of the user device 306 etc. The additional characteristics described above are examples only, and the user device 306 may be associated with fewer, additional or alternative characteristics. The additional characteristics may form a portion of the HTTP header carried in the user requests submitted between the user device 306, the plurality of edge servers 304A-304C and/or the origin server 302.

Origin Server 302

Figure 2:
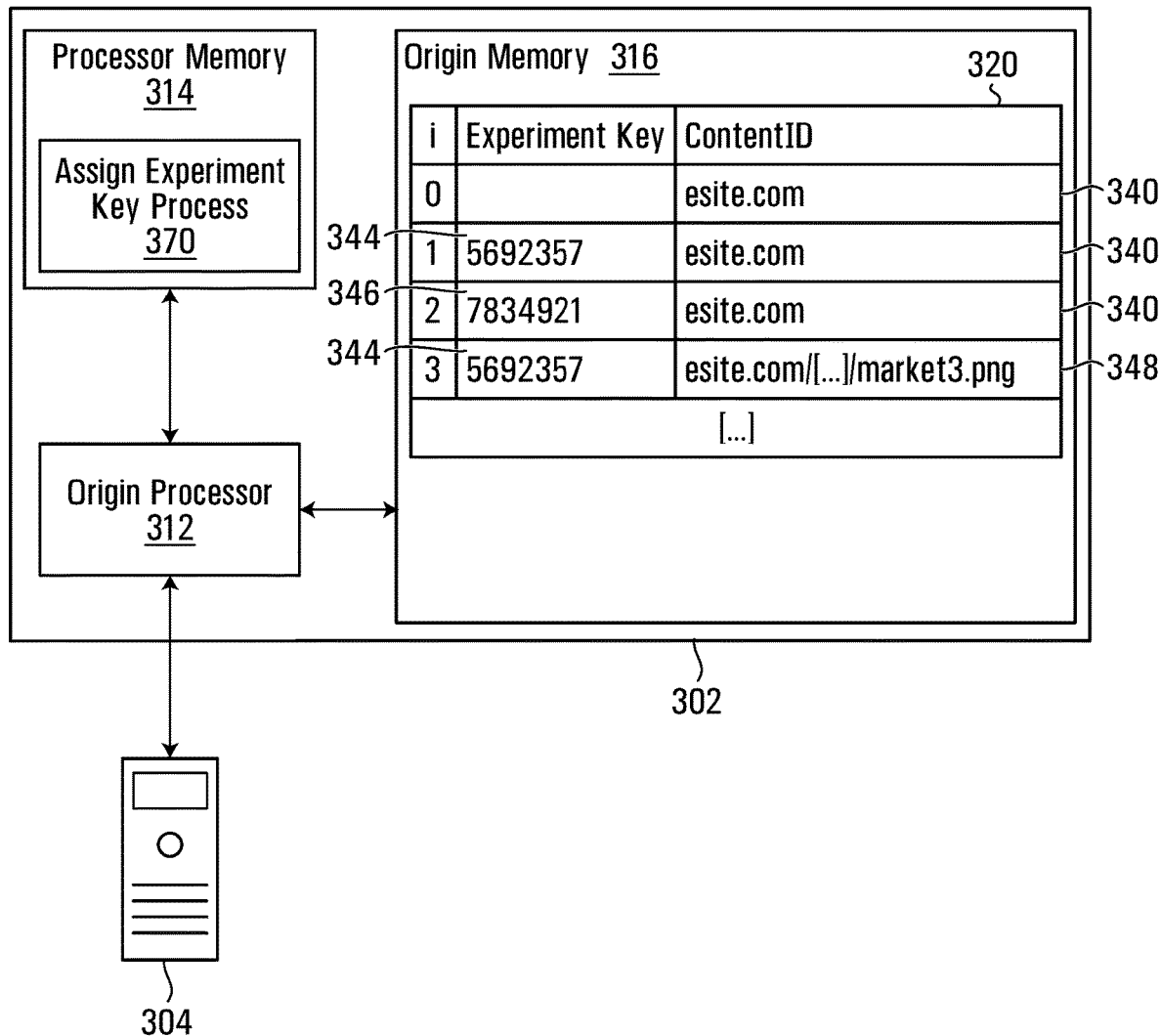
FIG. 2 is a schematic of the origin server of FIG. 1 in accordance with one embodiment.

A block diagram of the origin server 302 in accordance with one embodiment is shown in FIG. 2. In the embodiment shown, the origin server 302 may include at least one origin processor 312 and an origin program memory 314 and an origin storage memory 316 in communication with the origin processor 312. Other examples of the origin server 302 may include fewer, additional or alternative components. Additionally, although only a single origin processor 312, a single origin program memory 314 and a single origin storage memory 316 is shown in FIG. 2, other embodiments of the origin server 302 may include more than one of these components.

The origin storage memory 316 stores information received or generated by the origin processor 312 and may generally function as an information or data store. In the embodiment shown in FIG. 2, the origin storage memory 316 includes a content datastore 320; in other embodiments, the origin storage memory 316 may include fewer or additional datastores, and may include a user datastore for example. The origin program memory 314 stores various blocks of code (alternatively called processor, machine and/or computer executable instructions), including codes for directing the origin processor 312 to perform various processes, such as an assign experiment key process 370 described below. The origin program memory 314 may also store database management system codes for managing the datastores in the origin storage memory 316. In other embodiments, the origin program memory 314 may store fewer, additional or alternative codes for directing the origin processor 312 to execute additional or alternative functions. The origin program and storage memories 314 and 316 may each be implemented as one or a combination of a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching thereof). The term "non-transitory computer-readable medium" or "non-transitory machine-readable medium" as used herein is defined to include any type of computer-readable storage device and/or storage disk and to exclude propagating signals and to exclude transmission media.

The origin processor 312 is configured to execute codes stored in the origin program memory 314 and to receive and transmit information to the plurality of edge servers 304A-304C (such as via an I/O interface (not shown)) and/or directly to the plurality of user devices 306A-306D. In the embodiment shown, the origin processor 312 is a server central processing unit and may be a multi-core processor. Additionally, in the embodiment shown, the origin processor 312, the origin program memory 314 and the origin storage memory 316 may all be located in a single data center at a single geographic location; in other embodiments, these components of the origin server 302 may be located at different geographic locations and may communicate with each other over a network, forming a cloud-based processor circuit.

Figure 3A:
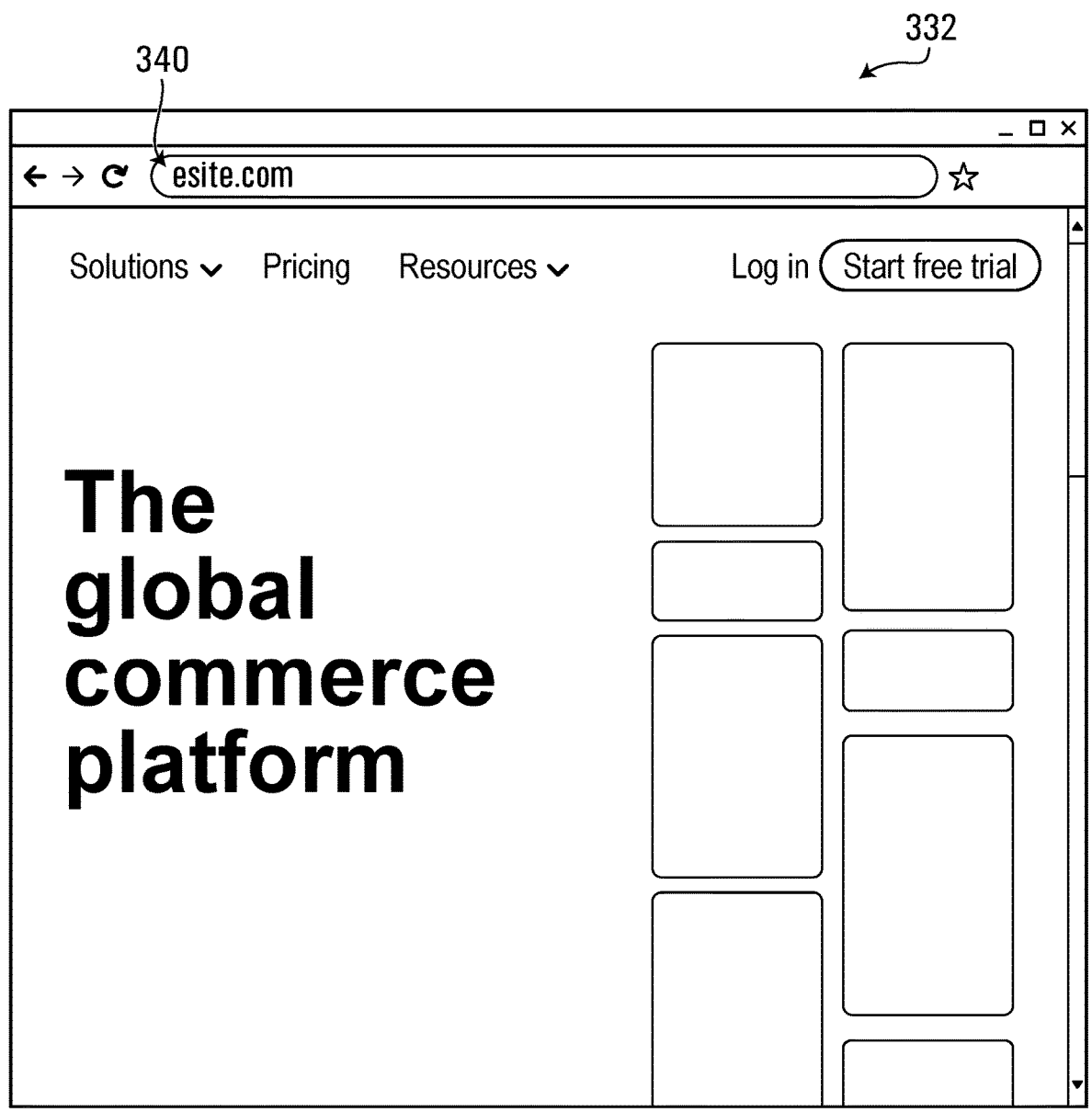
FIGS. 3A-3C are different versions of web applications hosted by the origin server of FIG. 1 in accordance with one embodiment.

The content datastore 320 may store a plurality of different content hosted by the origin server 302 associated with the content identifier uniquely identifying the corresponding content. For example, a particular webapp 330 shown in FIG. 3A may be stored associated with a unique IP address and/or a unique URL 340 (i.e., "esite.com") for example. As described above, the plurality of user devices 306A-306D may submit a request to retrieve a particular content by using the corresponding content identifier, and may submit a request to access the webapp 330 by inputting the URL 340 into an internet browser application for example.

Figure 3B:
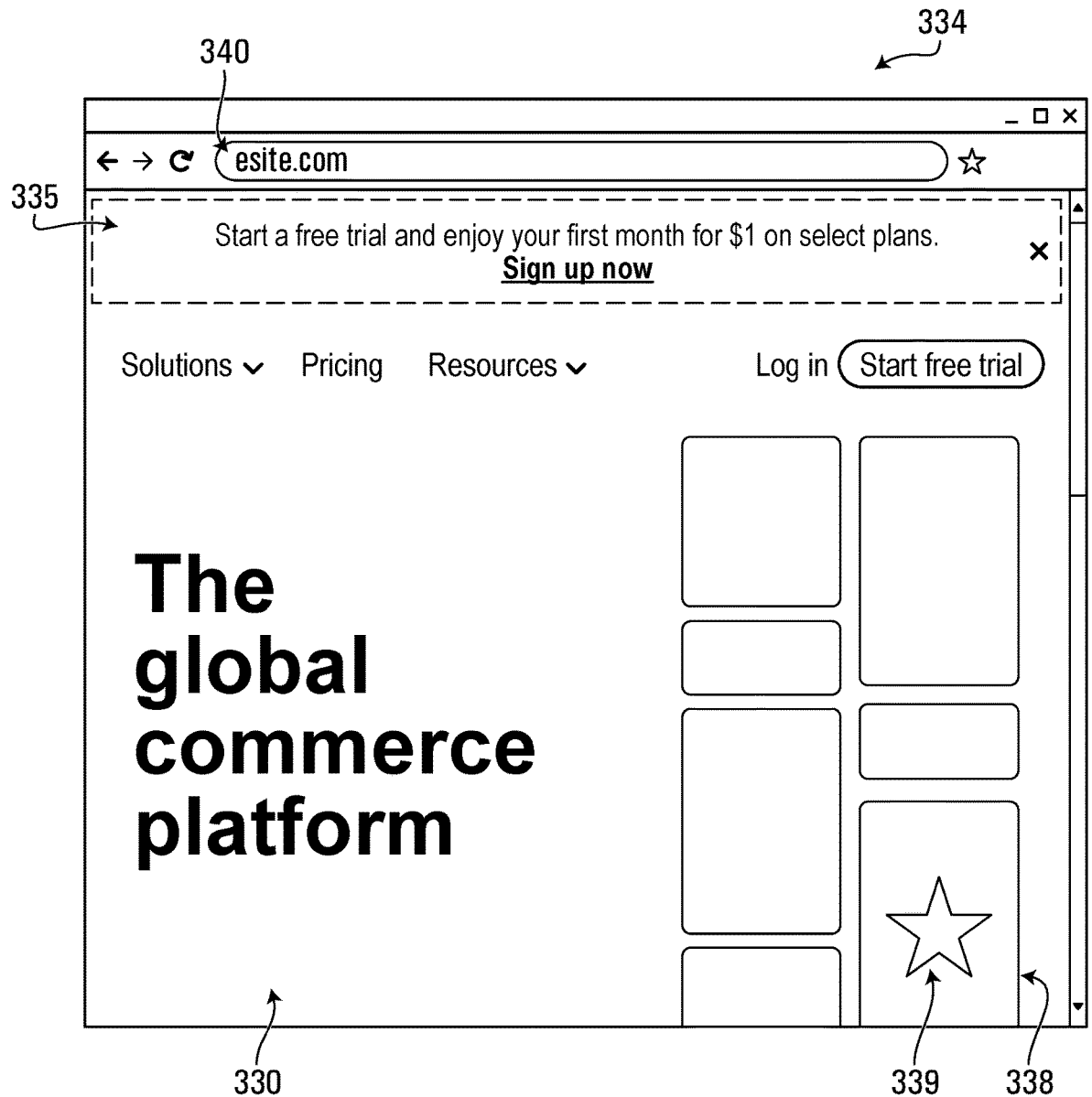
Figure 3C:
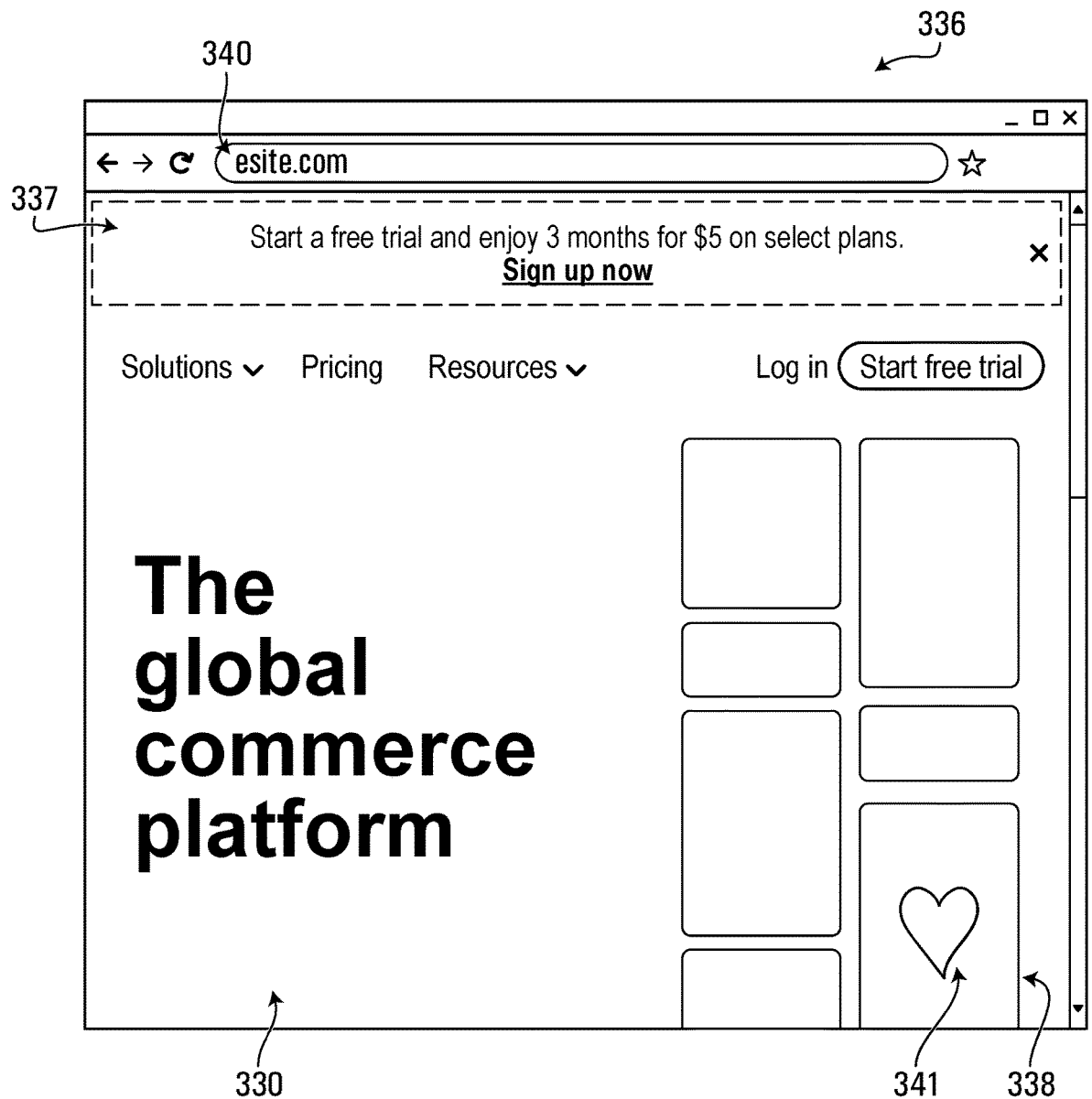

However, in some embodiments, content providers may wish to provide different versions of the particular content to different users. Different versions of the particular content may have different subject matter, may have different interfaces, and/or may provide different functionality. However, different versions of the particular content may be accessible via a same unique content identifier. This unique content identifier may be an URL that is easily remembered by users or which has optimized search parameters. For example, for the webapp 330 at the URL 340 "esite.com", there may be:
  a. a control version 332 of the webapp 330 shown in FIG. 3A which does not include any promotional banner;
  b. an experimental version A 334 shown in FIG. 3B which includes a version A promotional banner 335 for a first month subscription for $1 for select plans and an experimental version A 339 of an image 338; and
  c. an experimental version B 336 shown in FIG. 3C which includes a version B promotional banner 337 for a three-month subscription for $5 for select plans, and an experimental version B 341 of the image 338.

Content providers may wish to offer different versions of a particular content to different users for different reasons. For example, content providers may wish to launch a modified version of a content (e.g., modified subject matter, modified interface or modified functionality) to users slowly over time to troubleshoot potential issues with the modified version and/or to gauge user reception to the modified version. In such embodiments, the content providers may initially provide the modified version to 5% of users at a first time point, then to 20% of users at a second time point, then to 50% of the users at a third time point, and then finally to 100% of users at an Nth time point. Content providers may also or instead wish to display different versions of the particular content to different users based on characteristics of the user device 306 (and/or a user thereof), such as a geographical location of the user device 306 (and/or the user thereof) and/or a device type of the user device 306. For example, for a user device 306 (and/or a user thereof) geographically based in Europe, the content provider may wish to provide a version of content incorporating a privacy policy in compliance with the European General Data Protection Regulation (GDPR); in contrast, for a user device 306 (and/or a user thereof) geographically based in California, the content provider may instead wish to provide a version of that particular content incorporating a privacy policy in compliance with the California Consumer Privacy Act (CCPA). Similarly, for a user device 306 with a device type classified as an Apple® device, the content provider may wish to provide a version of content optimized for an Apple® operating system; in contrast, for a user device 306 with a device type classified as Android® device, the content provider may instead provide a version of that particular content optimized for an Android® operating system. Further, content providers may wish to run actual experiments to determine which version of a particular content is better received by users, such as which version results in higher click-through rates, longer user engagement, or higher purchase rates.

To provide different versions of a particular content, the content datastore 320 may store different versions of a particular content associated with an experiment key identifying an experimental version, but still associated with the same content identifier. For example, referring to FIGS. 2 and 3A-3B, the experimental version A 334 of the webapp 330 (shown in FIG. 3B) may be stored associated with both an experimental version A key 5 and the URL 340 in the content datastore 320, while the experimental version B 336 (shown in FIG. 3C) may be stored associated with both an experimental version B key 346 and the same URL 340. As such, a particular content identifier (e.g., the URL 340) may be associated with multiple experiment keys (e.g., the experimental version A key 344 and the experimental version B key 346) and have a 1 to N relationship. In contrast, the control version 332 of the webapp 330 (shown in FIG. 3A) may only be stored associated with the URL 340 in the content datastore 320, and may not be associated with any experiment key. This may allow the plurality of edge servers 304A-304C to provide the control version 332 in situations where the experimental version A 334 or the experimental version B 336 cannot be retrieved as described below. However, in other embodiments, the control version of a particular content may be stored with a control experiment key (not shown) for example.

Additionally, in some embodiments, a particular version of one content may be related to, and may be provided together with, a particular version of another content. For example, referring to FIGS. 2, 3B and 3C, the experimental version A 334 of the webapp 330 may be related to the experimental version A 339 of the image 338; whereas the experimental version B 336 of the webapp 330 may be related to the experimental version B 341 of the image 338. The experimental version A 334 of the webapp 330 and the experimental version A 339 of the image 338 may be thus related and may be provided together. In such embodiments, the content datastore 320 may store the experimental version A key 344 associated with both the URL 340 of the webapp 330 and with a universal resource indicator (URI) 348 of the image 338. As such, a particular experiment key (e.g., the experimental version A key 344) may also be associated with multiple content identifiers (e.g., the URL 340 and the URI 348) and may have a 1 to N relationship.

Assign Experiment Key Process 370

In some embodiments, the assignment of a same version of content to a particular user or user device 306 may need to persist over time, such that every user request from the user device 306 (and/or a user thereof) for that particular content returns the same version of that particular content. Referring to FIG. 2, to persist an assignment of the same version of a particular content to a particular user device 306 (and/or a user thereof), the origin processor 312 may execute the assign experiment key process 370 to assign an experiment key to a user identifier uniquely identifying a user device 306 (and/or a user thereof). In the embodiment shown, the assign experiment key process 370 comprises machine, processor and/or computer readable/executable instructions stored in the origin program memory 314 for execution by the origin processor 312; in other embodiments, the assign experiment key process 370 may comprise machine, processor and/or computer readable instructions alternatively stored on other non-transitory computer readable storage medium such as a CD-ROM, a floppy disk, a hard drive, a DVD, a Blu-ray disk or another component associated with the origin server 302; in yet other embodiments, the assign experiment key process 370 and/or parts thereof could alternatively be executed by a device other than the origin processor 312 and/or embodied in firmware or dedicated hardware.

The assign experiment key process 370 may be initiated in response to the origin server 302 receiving a user request for content. The user request may be transmitted by an edge server 304 in response to the edge server 304 itself receiving the user request from a particular user device 306 as described below. In other embodiments, the user request may be transmitted directly to the origin server 302 by a user device 306. The assign experiment key process 370 may involve directing the origin processor 312 to identify an experiment key for the user request based at least in part on a user identifier in the user request. For example, the origin processor 312 may also determine whether an experiment key can be directly retrieved from the user request (e.g., in the HTTP header) and then search the content datastore 320 to determine whether the experiment key is associated with a particular version of the content. The experiment key may be stored in a HTTP cookie in the HTTP header of the user request, and may have been assigned to the user device 306 by the origin server 302 and/or the plurality of edge servers 304A-304C after an initial interaction between the user device 306 and the CDN 310 and/or the origin server 302. In embodiments including the user datastore at the origin server 302, the origin processor 312 may search the user datastore to determine whether the user identifier retrieved from the user request is associated with a particular experiment key.

If the origin processor 312 determines that an experiment key cannot be identified (e.g., such as if there is no experiment key in HTTP header of the user request or if the user identifier in the user request cannot be found in the user datastore at the origin server 302), the assign experiment key process 370 may then involve directing the origin processor 312 to assign an experiment key to a user identifier in the user request. The experiment key may be assigned by being stored as an HTTP cookie associated with the user device 306 and may be carried in an HTTP header of any subsequent user requests transmitted between the user device 306, the plurality of edge servers 304A-304C and/or the origin server 302. In embodiments where the origin server 302 includes the user datastore, the experiment key may be assigned by being stored associated with the user identifier in the user datastore. This assignment of the experiment key may be based on characteristics associated with the user device 306 (and/or the user thereof), such as the geographical location tag and/or the device type tag(s) in the user request (e.g., in the HTTP header). For example, if the geographical location tag indicates that the user device 306 (and/or the user thereof) is based in Europe, the origin processor 312 may assign an experiment key associated with a European version of the content. Additionally or alternatively, if the device type tag(s) indicates that the user device 306 uses an Apple® operating system, the origin processor 312 may assign an experiment key associated with an Apple® device version of the content. This assignment of the experiment key may alternatively be based on characteristics associated with the origin server 302, the content, and/or a purpose of the different versions of a particular content. For example, if the purpose of different versions is to launch a modified version of the content slowly over time, the origin processor 312 may utilize a varying probability (e.g., 0-100%, based on point in time since launch of the modified version) to assign an experiment key associated with the modified version versus a control version of the content. Additionally or alternatively, if the purpose of different versions is to determine which version of the content is preferred by users, the origin processor 312 may have a fixed probability (e.g., 25%, based on number of experimental versions) of assigning an experiment key associated with an experimental version A versus an experimental version B versus a control version of the content. The assignments described above are examples only, and the retrieved user identifier may be assigned an experiment key in alternative or additional processes. Further, the assignments described above may be altered or combined in different embodiments.

As implicitly noted above, a particular version of content may be provided to more than one user device 306 of the plurality of user devices 306A-306C by assigning the same experiment key to the user identifier associated with each user device 306. For example, referring to FIGS. 2 and 3B, the user device 306A and the user device 306B originating from Europe may be both provided the experimental version A 334 of the webapp 330, as the experimental version A 334 may incorporate a privacy policy in compliance with the GDPR. A particular experiment key (e.g., the experiment version A key 334) may be association with both a user identifier identifying the user device 306A (and/or a user thereof) and a user identifier identifying the user device 306B (or a user thereof). As such, a particular experiment key (e.g., the experimental version A key 344) may be associated with more than one user identifier (e.g., both a user identifier associated with the user device 306A and a user identifier associated with the user device 306B) and may have a 1 to N relationship. In some embodiments, a control version of content may be provided to in response to a user request which does not include any experiment key in the HTTP header, or to a user request associated a user identifier present in the user datastore at the origin server 302 but not associated with any experiment keys.

The assign experiment key process 370 may then direct the origin processor 312 to store the experiment key directly as a HTTP cookie associated with the user device 306, such that the experiment key is carried in an HTTP header of future user requests transmitted between the user device 306, the plurality of edge servers 304A-304C and/or the origin server 302 for example. In embodiments including the user datastore at the origin server 302, the assign experiment key process 370 may direct the origin processor 312 to store the assigned experiment key associated with the retrieved user identifier in the user datastore. This can allow the origin processor 312 to first retrieve an experimental version of the content using the assigned experiment key (e.g., to search the content datastore 320) in response to future instances of a user request including the user identifier and/or the experiment key.

Edge Server 304

Figure 4:
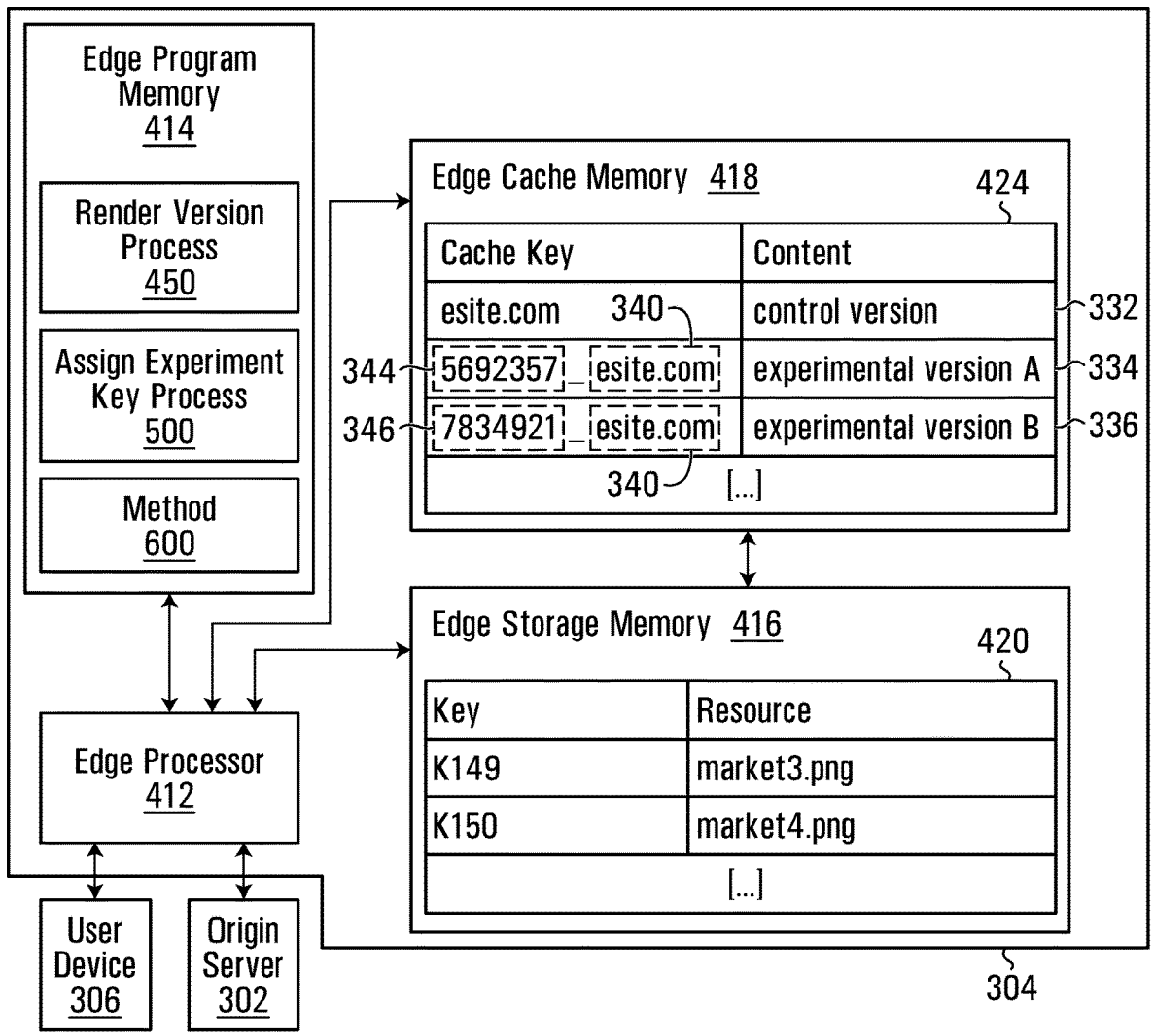
FIG. 4 is a schematic of an edge server of the plurality of edge servers of FIG. 1 in accordance with one embodiment.

A block diagram of the edge server 304 in accordance with one embodiment is shown in FIG. 4. In the embodiment shown, the edge server 304 may include at least one edge processor 412, and an edge program memory 414, an edge storage memory 416, and an edge cache memory 418 all in communication with the edge processor 412. Other embodiments of the edge server 304 may include fewer, additional or alternative components. Additionally, although only a single edge processor 412, a single edge program memory 414, a single edge storage memory 416 and a single edge cache memory 418 is shown in FIG. 4, other embodiments of the edge server 304 may include more than one of these components.

The edge storage memory 416 stores information received or generated by the edge processor 412 and may generally function as an information or data store. In the embodiment shown, the edge storage memory 416 includes a render datastore 420; in other embodiments, the edge storage memory 416 may include fewer, additional or alternative datastores and may include a user datastore for example; in yet other embodiments, the edge storage memory 416 may be implemented as a first edge storage memory (not shown) storing the render datastore 420 in a keyvalue datastore, and a second edge storage memory (not shown) storing the user datastore in a relational datastore. The edge program memory 414 stores various blocks of code for directing the edge processor 412 to execute various processes, such as a render version process 450, a retrieve experimental version process 500 and a method 600 described below. The edge program memory 414 may also store database management system codes for managing the datastores in the edge storage memory 416 and a cache policy for managing caches in the edge cache memory 418. In other embodiments, the edge program memory 414 may store additional or alternative codes for directing the edge processor 412 to execute additional or alternative functions. The edge cache memory 418 temporarily stores information received or generated by the edge processor 412 for caching thereof. In the embodiment shown, the edge cache memory 418 includes an edge cache 424; in other embodiments, the edge cache memory 418 may include fewer, additional or alternative caches. Similar to the origin program and storage memories 314 and 316 described above, the edge program, storage and cache memories 414, 416 and 418 may each be implemented as one, or a combination of, non-transitory computer and/or machine readable medium.

The edge processor 412 is configured to execute the codes stored in the edge program memory 414 and to receive and transmit information to the plurality of user devices 306A-306D and the origin server 302 (such as via an I/O interface (not shown)). In the embodiment shown, the edge processor 412 is a server central processing unit and may be a multi-core processor. In the embodiment shown, the edge processor 412, the edge program memory 414, the edge storage memory 416 and the edge cache memory 418 may all be located within a single data center at a single geographic location; in other embodiments, these components of the edge server 304 may be located at different geographic locations and may communicate with each other over a network, forming a cloud-based processor circuit.

As described above, the plurality of edge servers 304A-304C may receive user requests originating from the plurality of user devices 306A-306D on behalf of the origin server 302. In response to a user request, the edge server 304 may retrieve the requested content from the edge cache memory 418 when available therefrom, may render the requested content based on resources stored in the render datastore 420 when available therefrom, or may request the requested content from the origin server 302 as described below.

However, in embodiments where the origin server 302 provides different versions of the content in response to user requests originating from different user devices 306, pre-existing or standard cache memory structures may not be responsive to different versions (e.g., does not store any indication of the experiment keys) of the content and may only be responsive to the content identifier (e.g., URL) which may be the same for all versions of the content. To provide different versions of a particular content, the edge cache 424 may store a plurality of different experimental versions of the content, each experimental version associated with a respective different experiment key of a plurality of different experiment keys. For example, the experiment key may be a portion of a cache key of the edge cache 424. A "cache key" may be a unique identifier for content stored in the edge cache 424 and may be generated using different components of a user request originating from the user device 306. A cache key may be transmitted from the edge processor 412 to the edge cache memory 418 in a cache fetch request. A hit indication may be generated by the edge cache 424 when a cache key generated using a user request matches a cache key in the edge cache 424. In the embodiment shown in FIG. 4, the edge cache 424 may store the experimental version A 334 of the webapp 330 associated with a cache key including both the experimental version A key 344 and the URL 340, and may store the experimental version B 336 of webapp 330 associated with a cache key including both the experimental version B key 346 and the URL 340. In contrast, the edge cache 424 may store the control version 332 of the webapp 330 associated with a cache key which excludes the experiment key and only includes only the URL 340. Caching control versions of content using only the content identifier and without the experiment key may allow CDN 310 to retrieve the control version of the content in situations where the experimental version of the content cannot be retrieved (e.g., "fail" to the control version of the content instead of returning an error message that the experimental version cannot be retrieved) as described below. However, in other embodiments, the control version may be retrieved using a cache key including both a control key and the content identifier.

In some embodiments, the cache fetch request may also include additional characteristics of the user device 306 (and/or a user thereof), such as a geographical location of the user device 306 (and/or the user thereof) and/or a device type of the user device 306. For example, the cache key may also include the geolocation tag and/or the device type tag(s). Including additional characteristics of the user device 306 (and/or the user thereof) in the cache key may reduce a computational overhead of the edge processor 412 when executing the retrieve experimental version process 500 described below, as the edge processor 412 may only be required to consider the user identifier associated with the user device 306 when assigning an experiment key to a user request. This may be beneficial in situations where the network provider of the CDN 310 only allows very small or computationally efficient codes to run on directly the edge processor 412, or where the network provider charges a fee for computational overhead at the edge processor 412.

Additionally, pre-existing or standard content delivery networks may not be able to provide a specific version of content to a particular user device 306, as it may not be able to determine which experiment key is associated with which user identifier directly at the edge server 304. The user request may thus be initially transmitted by the edge server 304 to the origin server 302 to determine which experiment key is associated with the user identifier in the user request (e.g., by searching the user datastore at the origin server 302 for example). However, continuing to transmit a large number of user requests to the origin server 302 may reduce or remove the caching functionality and the DDoS protection functionality enabled by the CDN 310. To address this problem and persistently provide a specific version of content to a particular user device 306, the edge program memory 414 may store codes which allow the edge processor 412 to assign an experiment key to a user request (or otherwise identify an experiment key for a user request) based at least in part on the user identifier directly at the edge server 304 (e.g., the retrieve experimental version process 500 described below). The experiment key may be stored as an HTTP cookie associated with the user device 306 and may be carried in an HTTP header of the user requests transmitted between the user device 306, the plurality of edge servers 304A-304C and/or the origin server 302. In embodiments where the edge server 304 includes the user datastore, the experiment key may be stored associated with the user identifier in the user datastore. In this way, the assignment and delivery of different versions (e.g., experimental versions) may be implemented at the edge server 304, rather than falling back to the origin server 302, resulting in reduced latency and load times (since the user request and response need not travel between the edge server 304 and origin server 302) and protection against DDoS attacks (since not all user requests are transmitted to the origin server 302).

A particular experiment key (e.g., the experimental version A key) may be associated with more than one user device (e.g., the user device 306A and 306B for example), such that a particular experimental version of the content may be provided to more than one user device 306. Additionally, some user devices (e.g., the user device 306D) may not be associated with any experiment keys, which may indicate that a control version of the content should be provided.

Further still, pre-existing or standard content delivery networks may not be responsive to the origin server 302 being unavailable to provide a particular experimental version of the content and may return an error message in response to user requests for retrieving that particular experimental version. This issue may be exacerbated when the origin server 302 is the only server that can render a particular experimental version of the content or determine that a particular user identifier is associated with a particular experiment key. To address this problem and provide redundancy mechanisms for the origin server 302, the edge program memory 414 may store codes which direct the edge processor 412 to render a particular version of the content directly at the edge server 304 (e.g., the render version process 450 described below) based on resources stored in the render datastore 420 and/or codes which direct the edge processor 412 to transmit a stale experimental version and/or a control version of the content when a particular experimental version of the content cannot be retrieved (e.g., the retrieve experimental version process 500 described below). In this way, the user is less likely to receive an error message in response to the user request, but rather a stale version and/or control version of the content may be delivered to the user.

The render datastore 420 may be a keyvalue datastore including a key associated with a resource required to render different versions of the content. For example, to render a website or a webapp, the render datastore 420 may store resources including image data, video data, audio data, JavaScript code, and/or style sheets. In the embodiment shown in FIG. 4, the render datastore 420 stores the image data "market3.png" corresponding to experimental version A 339 of the image 338 which may be required to render the experimental version A 334 of the webapp 330 (shown in FIG. 3B).

Render Version Process 450

Still referring to FIG. 4, as described above, in some embodiments, the edge server 304 may include rendering functionality and may execute the render version process 450 to render a particular version of content directly at the edge server 304 independently of the origin server 302 and using the resources stored in the render datastore 420. In the embodiment shown, the render version process 450 comprises machine, processor and/or computer readable/executable instructions stored in the edge program memory 414 for execution by the edge processor 412; in other embodiments, the render version process 450 may comprise processor, machine and/or computer readable instructions alternatively stored on other non-transitory computer readable storage medium such as a CD-ROM, a floppy disk, a hard drive, a DVD, a Blu-ray disk or another component associated with the edge server 304; in yet other embodiments, the render version process 450 and/or parts thereof could alternatively be executed by a device other than the edge processor 412 and/or embodied in firmware or dedicated hardware.

For example, to render a website or webapp, the render datastore 420 may store resources including external images, external video data, external audio data, JavaScript code, and/or style sheets. To render other content, the render datastore 420 may include additional or alternative resources or data. The render version process 450 may involve directing the edge processor 412 to render a particular version of the content in situations where that particular version cannot be retrieved from the edge cache memory 418 as described below, without transmitting the user request for that particular version to the origin server 302. In certain embodiments, content implemented using legacy server-side rendering frameworks such as Ruby on Rails and/or Django may not be suitable for rendering at the edge server 304 independent of the origin server 302. However, content implemented using client-side rendering frameworks such as React, Angular, Ember, and/or Backbone, or modern server-side rendering frameworks such as Remix, may be more adapted for rendering at the edge server 304. Additionally, content missing resources in the render datastore 420 may not be suitable for rendering at the edge server 304.

Retrieve Experimental Version Process 500

Referring to FIGS. 4 and 5A-5C, in some embodiments, the edge server 304 may execute the retrieve experimental version process 500 to retrieve a version of content requested in a user request in a manner that utilizes the edge cache memory 418 and provides redundancy for the origin server 302 to address problems with pre-existing or standard cache memory structures or content delivery networks described above. In the embodiment shown, the retrieve experimental version process 500 comprises processor, machine and/or computer readable instructions stored in the edge program memory 414 for execution by the edge processor 412; in other embodiments, the retrieve experimental version process 500 may comprise computer and/or machine readable instructions alternatively stored on other non-transitory computer readable storage medium such as a CD-ROM, a floppy disk, a hard drive, a DVD, a Blu-ray disk or another component associated with the edge server 304; in yet other embodiments, the retrieve experimental version process 500 and/or parts thereof could alternatively be executed by a device other than the edge processor 412 and/or embodied in firmware or dedicated hardware. Further, although the retrieve experimental version process 500 in accordance with one embodiment is described with reference to the flowchart illustrated in FIGS. 5A-5C, other methods of implementing the retrieve experimental version process 500 may alternatively be used. For example, the order of execution of the blocks may be altered, and/or some of the blocks described may be altered, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 5A:
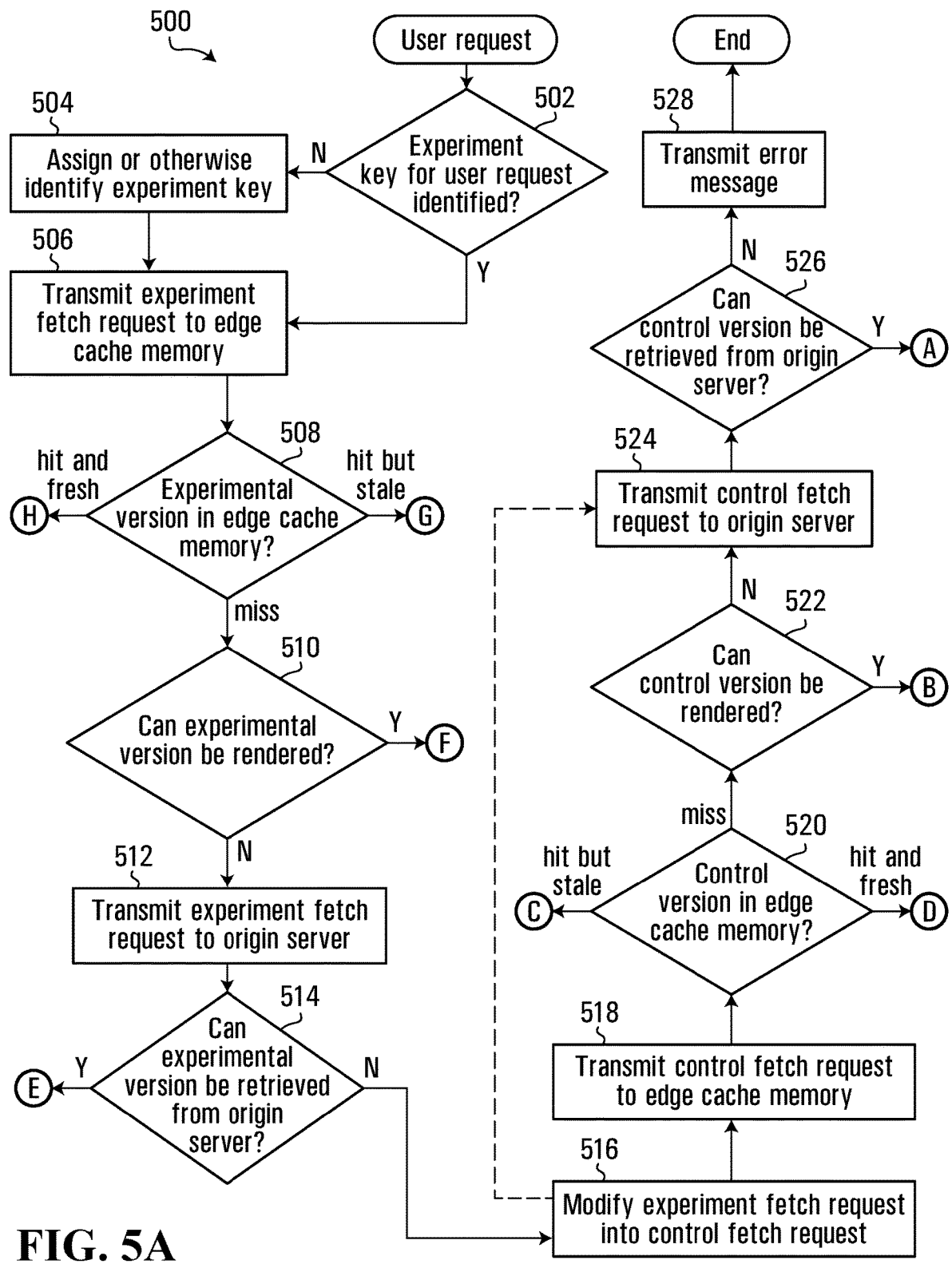
FIGS. 5A-5C are portions of a flowchart of a retrieve experimental version process performed at the edge server in accordance with one embodiment.

Referring now to FIG. 5A, the retrieve experimental version process 500 begins at block 502 in response to receiving a user request for content hosted by the origin server 302. The user request may be transmitted by a user device 306 of the plurality of user devices 306A-306C and may include the user identifier associated with the user device 306. The user request may include additional characteristics (e.g., the geolocation tag and/or the device type(s)) associated with the user device 306. Block 502 may involve causing the edge processor 412 identify an experiment key associated with the user request. For example, block 502 may direct the edge processor 412 to attempt to identify the experiment key directly from the HTTP header of the user request. In embodiments including the user datastore at the edge server 304, the edge processor 412 may use the user identifier to search the user datastore at the edge server 304 to determine whether the user identifier is stored associated with any experiment keys at the edge server 304. Additionally or alternatively, in embodiments including the user datastore at the origin server 302, the edge processor 412 may also transmit the user identifier to the origin server 302 and request the origin processor 312 to search the user datastore at the origin serve 302 to determine whether the user identifier is associated with any experiment keys at the origin server 302.

If at block 502, the edge processor 412 determines that the retrieved user identifier is not associated with an experiment key, such as if an experiment key cannot be retrieved from the HTTP header of the user request, the user identifier cannot be identified in the user datastore at the edge server 304 or in the user datastore at the origin server 302, the retrieve experimental version process 500 continues to block 504. Block 504 may involve directing the edge processor 412 to assign an experiment key to the user request at the edge server 304 or otherwise identify an experiment key for the user request at the edge server 304. This assignment may be based on the user identifier, characteristics of the user device 306, the origin server 302 and/or the content, and/or based on a purpose of the different versions of a particular content, in a manner similar to the assign experiment key process 370 described above. As also briefly described above, in some embodiments, block 504 may direct the edge processor 412 to assign an experiment key based only on the user identifier. This may reduce a computational overhead of the edge processor 412 in executing block 504 to assign the experiment key, as the edge processor 412 may not be required to consider any additional characteristics associated with the user device 306 aside from the user identifier. This may be beneficial where the network provider of the CDN 310 only allows very small or computationally efficient codes to run on the edge processor 412, or where the network provider charges a fee for computational overhead at the edge processor 412. As a specific example, block 504 may involve JavaScript codes operable to provide a verdict (e.g., assignment of an experiment key) based on rulesets performed on the user identifier, wherein the rulesets may include a percentage of incoming user requests for example.

Block 504 may also involve directing the edge processor 412 to store the experiment key as a HTTP cookie associated with the user device 306. Alternatively or additionally, in some embodiments, block 504 may involve directing the edge processor 412 to store the experiment key in the user datastore at the edge server 304 or transmitting the user identifier and the experiment key as an associated pair to the origin server 302 for storage in the user datastore at the origin server 302.

The retrieve experimental version process 500 then continues to block 506, which may involve directing the edge processor 412 to transmit an experiment fetch request including the experiment key to the edge cache memory 418 to retrieve an experimental version of the content associated with the experiment key. Further, if at block 502, the edge processor 412 determines that the user identifier is associated with an experiment key, the retrieve experimental version process 500 may continue directly to block 506 from block 502. The experiment fetch request may include a cache key and may request the edge cache memory 418 to search the edge cache 424 using the cache key. The cache key may include the experiment key identified or otherwise assigned at block 502 or block 504 and generally includes the content identifier for the content requested in the user request. As briefly described above, in some embodiments, the experiment fetch request and/or cache key may include additional characteristics of the user device 306 (or a user thereof), and may include the geolocation tag and/or the device type tag(s).

The retrieve experimental version process 500 then continues to block 508, which may involve directing the edge processor 412 to determine whether the experiment fetch request is able to retrieve the experimental version of the content to the edge cache memory 418. For example, the edge processor 412 may wait to receive one or more indications from the edge cache memory 418 indicating whether a particular experimental version of the content is stored in the edge cache 424 and a state of the stored experimental version. For example, the edge cache memory 418 may transmit a miss indication that an experimental version of the content is not stored in the edge cache 424, such as if the edge cache memory 418 is not able to identify any entry in the edge cache 424 having a cache key including both the experiment key and the content identifier.

The edge cache memory 418 may instead transmit a stale indication that the experimental version of the content is stored in the edge cache 424 but has an expired time stamp, such as if the edge cache memory 418 is able to identify an entry in the edge cache 424 having a cache key corresponding to both the experiment key and the content identifier but the max-age has expired (e.g., a stale copy of the experimental version of the content). The edge cache memory 418 may instead transmit a hit and fresh indication that the experimental version of the content is stored in the edge cache 424 and that content has an active time stamp, such as if the edge cache memory 418 is able to identify an entry in the edge cache 424 having a cache key corresponding to both the experiment key and the content identifier and the max-age is active (e.g., an active copy of the experimental version of the content). The indications described above are examples only, and the edge cache memory 418 may transmit fewer, additional or alternative indications in different embodiments.

If at block 508, the edge processor 412 receives the miss indication, the retrieve experimental version process 500 then continues to block 510. Block 510 may involve directing the edge processor 412 to determine whether the experimental version of the content can be rendered independent of the origin server 302, such as using the render version process 450 described above. For example, the edge processor 412 may determine whether the experimental version of the content is implemented in legacy server-side rendering frameworks versus client-side rendering frameworks or modern server-side rendering frameworks. If the experimental version of the content is implemented in legacy server-side rendering frameworks, the edge processor 412 may determine that it can only be rendered at the origin server 302; alternatively, if the experimental version of the content is implemented in a client-side rendering framework or a modern server-side rendering framework, the edge processor 412 may determine that it can be rendered at the edge server 304 independent of the origin server 302. Additionally or alternatively, the edge processor 412 may determine whether all resources for rendering the experimental version of the content is available from the render datastore 420.

If at block 510, the edge processor 412 determines that the experimental version of the content cannot be rendered directly at the edge server 304, the retrieve experimental version process 500 continues to block 512. Block 512 may involve directing the edge processor 412 to transmit the experiment fetch request to the origin server 302 to retrieve the experimental version of the content from the origin server 302. The experiment fetch request may request the origin server 302 to render the experimental version and transmit it back to edge server 304. The retrieve experimental version process 500 then continues to block 514, which may involve directing the edge processor 412 to determine whether the experimental version of the content can be retrieved from the origin server 302. For example, the edge processor 412 may determine that the experimental version cannot be retrieved from the origin server 302 in response to one or more error messages from the origin server 302 or after a set period of time has passed without a response from the origin server 302. In some situations, the origin server 302 may be down and may be unable to respond to any requests; in other situations, the origin server 302 may be overloaded and may take more time than desired to render and transmit the experimental version to the edge server 304.

If at block 514, the edge processor 412 receives an indication that the experimental version of the content cannot be retrieved from the origin server 302, the retrieve experimental version process 500 continues to block 516. Block 516 may direct the edge processor 412 modify the experiment fetch request into a control fetch request. For example, in some embodiments, the edge processor 412 may remove the experiment key from the experiment fetch request to generate a control fetch request including only the content identifier and/or the content identifier in combination with other characteristics of the user device 306, such as the geolocation tag and/or the device type tag(s). Alternatively, the edge processor 412 may replace the experiment key in the experiment fetch request with a control key to generate a control fetch request including both the control key and the content identifier. Specifically, in some embodiments, the edge processor 412 may input the content identifier into the "assign or otherwise identify experiment key" codes at block 504 described above to receive a control verdict (e.g., the control key) based on the content identifier. Modifying the experiment fetch request into the control fetch request allows for the CDN 310 to be responsive to situations where both the edge server 304 and the origin server 302 are unable to provide the experimental version by providing the control version of the content instead. The control version may be more likely to receive a hit indication from the edge cache memory 418 as the cache key associated with the control version (see FIG. 4) may only include a commonly requested URL or may include a more commonly utilized control key. This allows the CDN 310 to "fail" to the control version of the content instead of returning an error message if the experimental version of the content cannot be retrieved from the edge server 304 or the origin server 302.

The retrieve experimental version process 500 then continues to block 518 and block 520, which may involve directing the edge processor 412 to respectively transmit the control fetch request to the edge cache memory 418 and to determine whether the control fetch request is able to the retrieve the control version of the content from the edge cache 424. For example, block 520 may direct the edge processor 412 to wait to receive one or more indications from the edge cache memory 418 indicating whether the control version of the content is stored in the edge cache 424 and a state of the stored control version. For example, the edge cache memory 418 may transmit a miss indication that the control fetch request is not able to retrieve any content stored in the edge cache 424, such as if the edge cache memory 418 is not able to identify an entry in the edge cache 424 having a cache key corresponding to the content identifier. The edge cache memory 418 may instead transmit a hit but stale indication that the control fetch request is able to retrieve content stored in the edge cache 424 but that content has an expired time stamp, such as if the edge cache memory 418 is able to identify an entry in the edge cache 424 having a cache key corresponding to the content identifier but the max-age has expired (e.g., a stale copy of the control version of the content). Finally, the edge cache memory 418 may instead transmit a hit and fresh indication that the control fetch request is able to retrieve content stored in the edge cache 424 and that content has an active time stamp, such as if the edge cache memory 418 is able to identify an entry in the edge cache 424 having a cache key corresponding to the content identifier and the max-age is active (e.g., an active copy of the experimental version of the content). The indications described above are examples only, and the edge cache memory 418 may transmit fewer, additional or alternative indications in different embodiments.

If at block 520, the edge processor 412 receives the miss indication that the control version of the content is not present in the edge cache memory 418, the retrieve experimental version process 500 then continues to block 522. Block 522 may involve directing the edge processor 412 to determine whether the control version of the content can be rendered independently of the origin server 302, such as by using the render version process 450 described above. For example, the edge processor 412 may determine the rendering framework of the control version of the content and/or whether rendering resources for the control version are fully available in the render datastore 420 in a manner similar to block 510 described above.

If at block 522, the edge processor 412 determines that the control version of the content cannot be rendered independent of the origin server 302, the retrieve experimental version process 500 continues to block 524 and block 526. Block 524 may involve directing the edge processor 412 to transmit the control fetch request to the origin server 302 in a manner similar to block 512 described above. Block 526 may involve directing the edge processor 412 to determine whether the control version of the content can be retrieved from the origin server 302 in a manner similar to block 514 described above. For example, the edge processor 412 may determine that the control version cannot be retrieved from the origin server 302 in response to one or more error messages from the origin server 302 or after a set period of time has passed without a response from the origin server 302. In some embodiments, the retrieve experimental version process 500 may proceed directly from "modify experiment fetch request into control fetch request" block 516 to block 524 to transmit the control fetch request to the origin server 302 and bypass transmission of the control fetch request to the edge cache memory 418 at block 518, block 520 and block 522.

If at block 526, the edge processor 412 receives an indication that the control version of the content cannot be retrieved from the origin server 302, the retrieve experimental version process 500 may then proceed to block 528. Block 528 may involve directing the edge processor 412 to transmit an error message to the user device 306 in response to the user request. The error message may be a server error message or a session timeout error message for example. Accordingly, the retrieve experimental version process 500 may issue the error message to the user device 306 only after both the experimental version and the control version of the content is found to be unretrievable or unrenderable at both the edge server 304 and the origin server 302. The retrieve experimental version process 500 then ends.

Figure 5B:
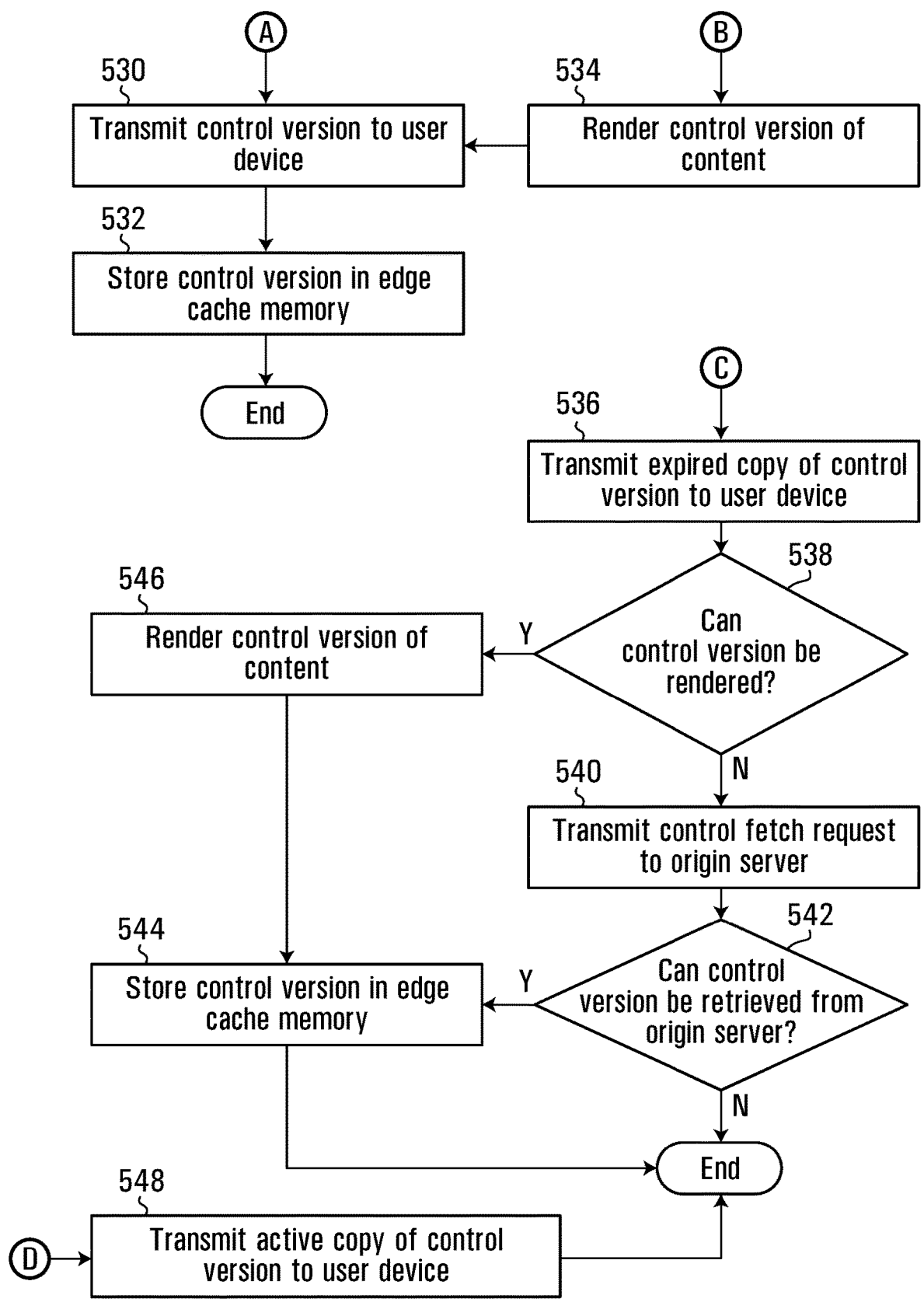

However, referring to FIGS. 5A and 5B, if at block 526, the edge processor 412 receives an indication that the control version of the content can be retrieved or has been received from the origin server 302, the retrieve experimental version process 500 then continues to block 530 and block 532, which may involve directing the edge processor 412 to, respectively, transmit the control version to the user device 306 and store the control version in the edge cache memory 418. For example, the edge processor 412 may store the control version of the content in the edge cache 424 associated with the content identifier but not associated with any experiment key. For example, the cache key associated with the control version may only include the content identifier in a manner similar to the control version 332 of the webapp 330 stored in the edge cache 424 shown in FIG. 4 for example. In other embodiments where the control fetch request includes the control key, block 532 may instead direct the edge processor 412 to store the control version in the edge cache 424 associated with the content identifier and the control key. This may allow the retrieve experimental version process 500 to receive a hit indication (e.g., a hit and fresh indication or a hit but stale indication) at block 520 in response to future instances of a user request for the control version of the content.

If at block 522, the edge processor 412 determines that the control version of the content can be rendered independent of the origin server 302, the retrieve experimental version process 500 continues to block 534. Block 534 may involve directing the edge processor 412 to render the control version of the content directly at the edge server 304. For example, the edge processor 412 may execute the render version process 450 described above for the control version of the content. The retrieve experimental version process 500 then continues to block 530 and block 532 described above to transmit the rendered control version to the user device 306 and store the rendered control version in the edge cache memory 418.

If at block 520, the edge processor 412 receives the hit but stale indication that the control version of the content is present in the edge cache memory 418 but is an expired copy, the retrieve experimental version process 500 then continues to block 536. Block 536 may involve directing the edge processor 412 to transmit the expired copy of control version of the content to the user device 306. Accordingly, the retrieve experimental version process 500 may not issue any error messages to the user device 306 when there is only an expired copy of the control version of the content in the edge cache memory 418 and may instead provide the expired copy to the user device 306. Providing the expired copy may limit a load time of the user device 306 for the control version of the content and reduce the likelihood that the user device 306 will receive an error message.

The retrieve experimental version process 500 then continues to block 538, which may involve directing the edge processor 412 to determine whether the control version of the content can be rendered independent of the origin server 302 in a manner similar to block 522 described above. If at block 538, the edge processor 412 determines that the control version of the content cannot be rendered, the retrieve experimental version process 500 continues to block 540 and block 542. Block 540 may involve directing the edge processor 412 to transmit the control fetch request to the origin server 302 in a manner similar to block 524 described above. Block 542 may involve directing the edge processor 412 to determine whether the control version of the content has been received from the origin server 302 in a manner similar to block 526 described above.

If at block 542, the edge processor 412 receives an indication that the control version of the content cannot be retrieved from the origin server 302, the retrieve experimental version process 500 then ends. In some embodiments, no error message is sent to the user device 306 when an active copy of the control version cannot be rendered at the edge server 304 or retrieved from the origin server 302 in the background, as the user device 306 has already been provided with the expired copy of the control version at block 536. However, if at block 542, the edge processor 412 receives the control version of the content from the origin server 302, the retrieve experimental version process 500 then continues to block 544, which may direct the edge processor 412 to store the control version of the content in the edge cache memory 418 in a manner similar to block 532 described above. As described above, this may allow the retrieve experimental version process 500 to receive a hit indication (e.g., a hit and fresh indication or a hit but stale indication) at block 520 in response to future instances of a user request for the control version of the content. The retrieve experimental version process 500 then ends. Accordingly, when there is only an expired copy of the control version of the content in the edge cache memory 418, the edge processor 412 may transmit that expired copy to the user device 306 while attempting to update the expired copy in the background afterwards.

If at block 538, the edge processor 412 determines that the control version of the content can be rendered directly at the edge server 304, the retrieve experimental version process 500 continues to block 546. Block 546 may involve directing the edge processor 412 to execute render version process 450 to render the control version of the content in a manner similar to block 534 described above. The render version process 450 then continues to block 544 to store the rendered control version in the edge cache memory 418.

If at block 520, the edge processor 412 receives the hit and fresh indication that the control version of the content is present in the edge cache memory 418 and is an active copy, the retrieve experimental version process 500 continues to block 548. Block 548 may involve directing the edge processor 412 to transmit the active copy of the control version to the user device 306. The retrieve experimental version process 500 then ends.

Figure 5C:
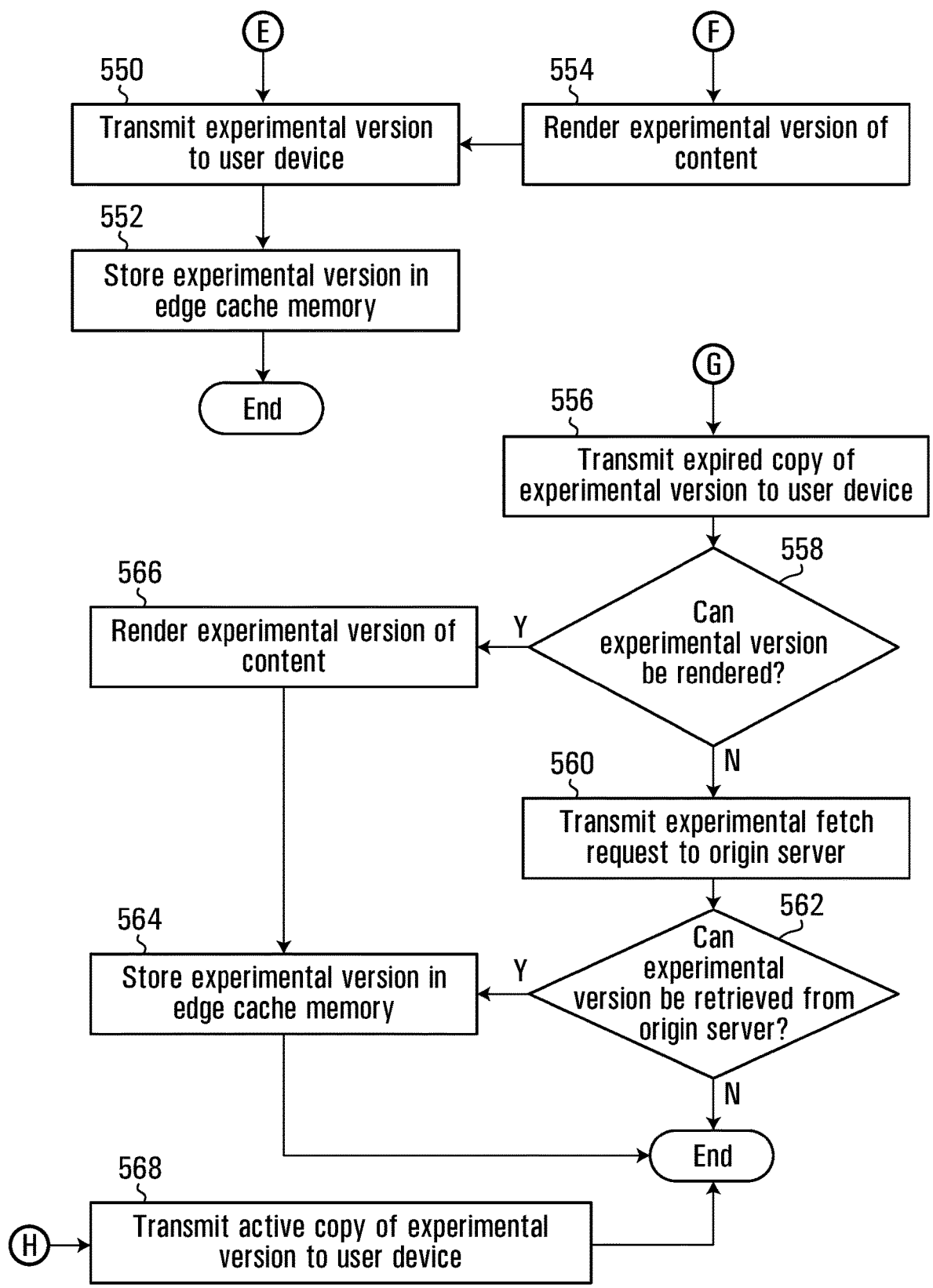

Referring to FIGS. 5A and 5C, if at block 514, the edge processor 412 does receive the experimental version of the content from the origin server 302, the retrieve experimental version process 500 continues to block 550. Block 550 may direct the edge processor 412 to transmit the received experimental version to the user device 306. The retrieve experimental version process 500 then continues to block 552, which may involve directing the edge processor 412 to store the experimental version in the edge cache memory 418 in association with both the content identifier and the experiment key. For example, the edge processor 412 may store the experimental version of the content in the edge cache 424 associated with the content identifier and with the experiment key. For example, the cache key associated with the experimental version may include both the content identifier and the experiment key in a manner to similar to the experimental version A 334 of the webapp 330 and the experimental version B 336 of the webapp 330 stored in the edge cache 424 shown in FIG. 4 for example. This may allow the retrieve experimental version process 500 to receive a hit indication (e.g., a hit and fresh indication or a hit but stale indication) at block 508 in response to future instances of a user request for the experimental version. The retrieve experimental version process 500 then ends.

If at block 510, the edge processor 412 determines that the experimental version of the content can be rendered independently of the origin server 302, the retrieve experimental version process 500 then continue to block 554. Block 554 may direct the edge processor 412 to execute the render version process 450 to render the experimental version of the content in a manner similar to block 534 and block 544 described above. The retrieve experimental version process 500 then continues to block 550 and block 552 described above to transmit the rendered experimental version to the user device 306 and store the rendered experimental version in the edge cache memory 418.

If at block 508, the edge processor 412 receives the hit but stale indication that the experimental version of the content is present in the edge cache memory 418 but is an expired copy, the retrieve experimental version process 500 then continues to block 556. Block 556 may involve directing the edge processor 412 to transmit the expired copy of the experimental version of the content to the user device 306. In this respect, the retrieve experimental version process 500 may also not issue any error messages to the user device 306 when there is only an expired copy of the experimental version in the edge cache memory 418. Transmitting the expired copy may limit a wait time of the user device 306 for the experimental version of the content, which may reduce latency and load time for the user device 306.

The retrieve experimental version process 500 then continues to block 558, which may involve directing the edge processor 412 to determine whether the experimental version of the content can be rendered at the edge server 304 independent of the origin server 302 in a manner similar to block 510 described above. If at block 558, the edge processor 412 determines that the experimental version cannot be rendered at the edge server 304, the retrieve experimental version process 500 continues to block 560 and block 562. Block 560 may involve directing the edge processor 412 to transmit the experimental fetch request to the origin server 302 to retrieve the experimental version in a manner similar to block 512 described above. Block 562 may involve directing the edge processor 412 to determine whether the experimental version of the content can be retrieved from the origin server 302 in a manner similar to block 514 described above.

If at block 562, the edge processor 412 receives an indication that the experimental version of the content cannot be retrieved from the origin server 302, the retrieve experimental version process 500 then ends. In some embodiments, no error message is sent to the user device 306 when an active copy of the experimental version cannot be retrieved from the origin server 302 in the background, as the stale copy of the experimental version was already transmitted to the user device 306 at block 556. However, if at block 562, the edge processor 412 does receives the experimental version of the content from the origin server 302, the retrieve experimental version process 500 then continues to block 564. Block 564 may direct the edge processor 412 to store the experimental version of the content in the edge cache memory 418 in a manner similar to block 552 described above. The retrieve experimental version process 500 then ends. Accordingly, the retrieve experimental version process 500 may not issue any error messages to the user device 306 when there is a stale copy of the experimental version of the content in the edge cache memory 418, and may attempt to update the stale copy of the experimental version in the background after transmitting the stale copy to the user device 306.

If at block 558, the edge processor 412 determines that the experimental version of the content can be rendered directly at the edge server 304 independent of the origin server 302, the retrieve experimental version process 500 continues to block 566. Block 566 may involve directing the edge processor 412 to execute the render version process 450 to render the experimental version of the content in a manner similar to block 554 described above.

If at block 508, the edge processor 412 receives the hit and fresh indication that the experimental version of the content is present in the edge cache memory 418 and is an active copy, the retrieve experimental version process 500 continues to block 568, which may involve directing the edge processor 412 to transmit the fresh copy of experimental version of the content to the user device 306. The retrieve experimental version process 500 then ends.

In response to another (a second) user request from another (a second) user device associated with a second user identifier, the retrieve experimental version process 500 may direct the edge processor 412 to identify or assign another (a second) experiment key at block 504 based on the second user identifier. This second experiment key may be different from the experiment key assigned for the user request from the user device 306, such that the first user device 306 and the second user device may be provided with different experimental versions of the content stored in the edge cache memory 418 when they request a same content identifier. However, in certain embodiments, the retrieve experimental version process 500 may direct the edge processor 412 to identify or assign the same experiment key at block 504 based on the second user identifier such that the first user device 306 and the second user device may be provided with a same experimental version of the content stored in the edge cache memory 418 when they request a same content identifier.

Alternative Method 600 for Retrieving an
Experimental Version of Content

Figure 6:
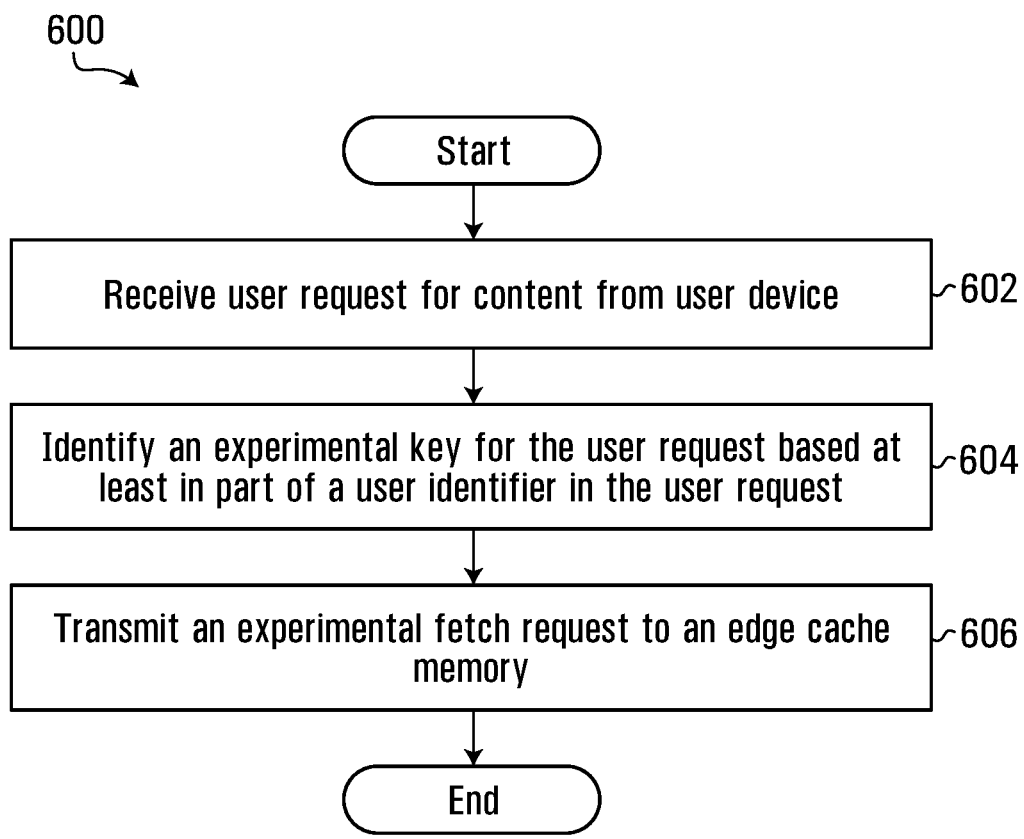
FIG. 6 is a flowchart of computer-implemented method for retrieving an experimental version of content performed at the edge server in accordance with one embodiment.

Referring to FIG. 6, a computer-implemented method for retrieving a version of content requested in a user request in a manner that utilizes the edge cache memory 418 and provides redundancy for the origin server 302 to address problems with pre-existing or standard cache memory structures and/or content delivery networks described above is shown generally at 600. In the embodiment shown, the method 600 is performed by the edge processor 412 executing processor, machine and/or computer readable/executable instructions stored in the edge program memory 414; in other embodiments, the method 600 may comprise processor, machine and/or computer readable instructions alternatively stored on other non-transitory computer readable storage medium; in yet other embodiments, the method 600 and/or parts thereof could alternatively be executed by a device other than the edge processor 412 and/or embodied in firmware or dedicated hardware. Further, although the method 600 in accordance with one embodiment is described with reference to the flowchart illustrated in FIG. 6, other methods of implementing the method 600 may alternatively be used. For example, the order of execution of the blocks may be altered, and/or some of the blocks described may be altered, eliminated, or combined.

At block 602, an edge server 304 of the plurality of edge servers 304A-304C receives a user request for content from a user device 306 of the plurality of user devices 306A-306D. The user request includes a user identifier associated with the user device 306. The user request may also include characteristics (e.g., the geolocation tag and/or the device type(s)) associated with the user device 306.

At block 604, the edge server 304 identifies an experiment key for the user request based at least in part on the user identifier. For example, the edge server 304 may retrieve an experiment key from the HTTP header of the user request (as described above, the experiment key may have been stored as an HTTP cookie associated with the user device 306 after an initial interaction of the user device 306 with the edge server 304 and/or the origin server 302). Alternatively or additionally, the edge server 304 may search the user datastore at the edge server 304 or submit a request to the origin server 302 to search the user datastore at the origin server 302 to determine whether the user identifier is associated with an experiment key. In some embodiments, the edge server 304 may identify an experiment key for the user request by assigning an experiment key for the user request directly at the edge server 304 based at least in part on the user identifier, and possibly also based on characteristics of the user device 306, the origin server 302 and/or the content, and/or based on a purpose of the different versions of a particular content, in a manner similar to block 504 and the assign experiment key process 370 described above. The experiment key may be associated with an experimental version of the content at the origin server 302 (e.g., the content datastore 320) and/or at the edge server 304 (e.g., the edge cache 424).

At block 606, the edge server 304 may then transmit an experiment fetch request to the edge cache memory 418 (e.g., in a manner similar to block 506 of the retrieve experimental version process 500 described above). The experiment fetch request may provide the experiment key to the edge cache memory 418, and may include a cache key including the experiment key for example. The experiment fetch request may include additional characteristics of the user device, such as the geolocation tag and/or the device type tag(s) associated with the user device 306 (and/or the user thereof) for example.

After the edge server 304 transmits the experiment fetch request to the edge cache memory 418, the edge server 304 may receive an indication that the experimental version of the content is not stored in the edge cache memory 418 or cannot be fetched from the edge cache memory 418 (e.g., in a manner similar to block 514 of the retrieve experimental version process 500 described above). In response, the edge server 304 may instead transmit the experiment fetch request to the origin server 302 to retrieve the experimental version from the origin server 302 (e.g., in a manner similar to blocks 512 and 514 described above). If the experimental version of the content from the origin server 302 is received at the edge server 304, the edge server 304 may store the experimental version in association with the experiment key in the edge cache memory 418 (e.g., in a manner similar to block 532 described above) and transmit the experimental version of the content to the user device 306 (e.g., in a manner similar to block 530 described above). However, in some situations, the edge server 304 may instead receive an indication that the experimental version of the content cannot be retrieved from the origin server 302. In response, the edge server 304 may modify the experiment fetch request into a control fetch request (e.g., in a manner similar to block 516 described above) and then transmit the control fetch request to at least one of the origin server 302 (e.g., in a manner similar to block 518 described above) or the edge cache memory 418 (e.g., in a manner similar to block 524 described above) to retrieve a control version of the content instead. This may allow the CDN 310 to "fail" to the control version of the content in situations where the experimental version of the content cannot be retrieved from either the edge cache memory 418 or the origin server 302.

After the edge server 304 transmits the experiment fetch request to the edge cache memory 418, the edge server 304 may receive a stale indication that the experimental version of the content stored in the edge cache memory 418 can be found, but is an expired copy. In response, the edge server 304 may instead deliver the expired copy of the experimental version of the content stored in the edge cache memory 418 to the user device 306 (e.g., in a manner similar to block 560 of the retrieve experimental version process 500 described above). However, after delivering the expired copy, the edge server 304 may request an active copy of the experimental version of the content from the origin server 302 (e.g., in a manner similar to block 560 described above). Accordingly, when there is only an expired copy of the experimental version of the content in the edge program memory 414, the edge server 304 may not issue any error messages to the user device 306, may instead provide the expired copy to the user device 306, and may attempt to retrieve an active copy of the experimental version in from the origin server 302 in the background. If an active copy of the experimental version of the content is received from the origin server 302, the edge server 304 may store the active copy in the edge cache memory 418 and in association with the experiment key (e.g., in the edge cache 424 and in a manner similar to block 564 for example).

After the edge server 304 transmits the experiment fetch request to the edge cache memory 418, the edge server 304 may instead receive a hit indication that the experimental version of the content stored in the edge cache memory 418 can be found and is an active copy. In response, the edge server 304 may deliver the active copy of the experimental version of the content stored in the edge cache memory 418 to the user device 306 (e.g., in a manner similar to block 548 of the retrieve experimental version process 500 described above).

In some embodiments, the experimental version of content or the control version of content may be rendered directly at the edge server 304 independently of the origin server 302 (e.g., using the render version process 450 and resources stored in the render datastore 420 described above). In such embodiments, in response to the edge server 304 receiving the miss indication that the experimental version of the content is not stored in the edge cache memory 418 or cannot be fetched from the edge cache memory 418, the edge server 304 may instead render the experimental version of the content based on data or resources stored in the render datastore 420 (e.g., in a manner similar to block 554 and block 556 of the retrieve experimental version process 500 described above). As described above, the render datastore 420 may be a keyvalue datastore and may be geographically proximate the edge processor 412 and geographically remote from the origin server 302. In response to receiving an indication that the experimental version of the content can be (or has been) rendered at the edge server 304, the edge server 304 may store the experimental version of the content in association with the experiment key in the edge cache memory 418 (e.g., in a manner similar to block 552 described above) and transmit the experimental version of the content to the user device 306 (e.g., in a manner similar to block 550 described above).

However, in some situations, the edge server 304 may instead receive an indication that the experimental version of the content cannot be rendered at the edge server 304. In response, the edge server 304 may modify the experiment fetch request into a control fetch request (e.g., in a manner similar to block 516 of the retrieve experimental version process 500 described above) and then transmit the control fetch request to at least one of the origin server 302 (e.g., in a manner similar to block 518 described above) or the edge cache memory 418 (e.g., in a manner similar to block 524 described above) to retrieve a control version of the content instead of the experimental version of the content. Again, this may allow the CDN 310 to "fail" to the control version of the content in situations where the experimental version of the content cannot be retrieved from the edge cache memory 418 and/or cannot be rendered using the edge server 304.

In response to the edge server 304 receiving the stale indication that the experimental version of the content is stored in the edge cache memory 418 but is an expired copy, the edge server 304 may instead deliver the expired copy of the experimental version of the content stored in the edge cache memory 418 to the user device 306 (e.g., in a manner similar to block 556 of the retrieve experimental version process 500 described above). After delivering the expired copy, the edge server 304 may attempt to render an active copy of the experimental version of the content at the edge server 304 (e.g., in a manner similar to block 566 described above). Accordingly, when there is only a stale copy of the experimental version of the content in the edge program memory 414, the edge server 304 may not issue any error messages to the user device 306, may instead provide the expired copy to the user device 306, and may render an active copy of the experimental version at the edge server 304 in the background. If an active copy of the experimental version of the content can be rendered at the edge server 304, the edge server 304 may store the active copy in the edge cache memory 418 and in association with the experiment key (e.g., in the edge cache 424 and in a manner similar to block 564 described above).

In some embodiments, the user device is a first user device, the user request is a first user request for a particular content, the user identifier is a first user identifier, and the experiment fetch request is a first experiment fetch request, and the first experiment fetch request retrieved a first experimental version of the content. The edge server 304 may receive a second user request for that particular content from a second user device. The second user request may include a second user identifier associated with the second user device. Block 604 may involve identifying a second experiment key for the second user request, the second experiment key based on the second user identifier (e.g., in a manner similar to block 504 of the retrieve experimental version process 500 described above). The second experiment key may be used in a second experiment fetch request to retrieve a second experimental version of the content for the second user device which is different from the first experimental version of the content for the first user device. In yet other embodiments, the edge sensor 304 may instead identify the same first experiment key for the second user request based on the second user identifier (e.g., again in a manner similar to block 504 described above). The first experiment key may be used in the second experiment fetch request to retrieve the same first experimental version of the content for the second user device as for the first user device.

Figure 7:
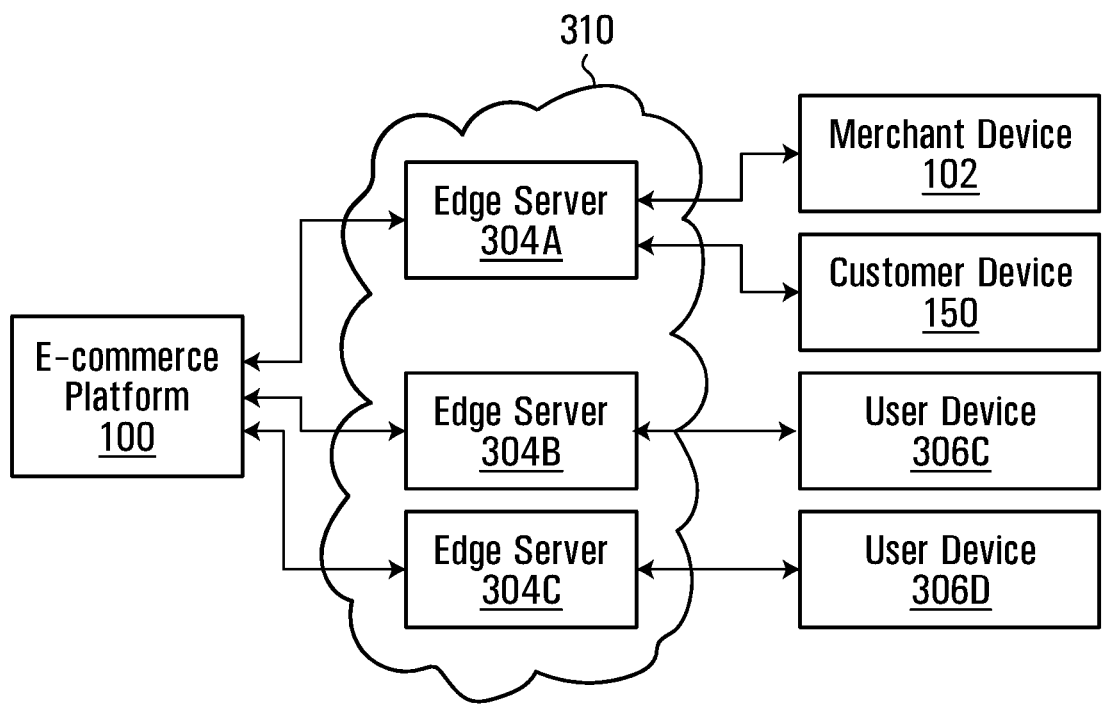
FIG. 7 is a block diagram of a system for delivering content in accordance with another embodiment including an example e-commerce platform.

FIG. 7 illustrates an example in which the origin server 302 of FIG. 1 is a commerce platform, referred to as e-commerce platform 100. The plurality of user device 306A-306D may include a customer device 150 and/or a merchant device 102. The customer device 150 and/or merchant device 102 may generate user requests to access content hosted by the e-commerce platform 100. The user requests may be initially received at the plurality of edge servers 304A-304C. One or more experiment keys to provide different versions of content hosted by the e-commerce platform 100 in response to the user requests may be identified at the plurality of edge server 304A-304C. One example of e-commerce platform 100 is described below for completeness.

Example E-commerce Platform

Although integration with a commerce platform is not required, in some embodiments, the methods disclosed herein may be performed on or in association with a commerce platform such as an e-commerce platform. Therefore, an example of a commerce platform will be described.

Figure 8:
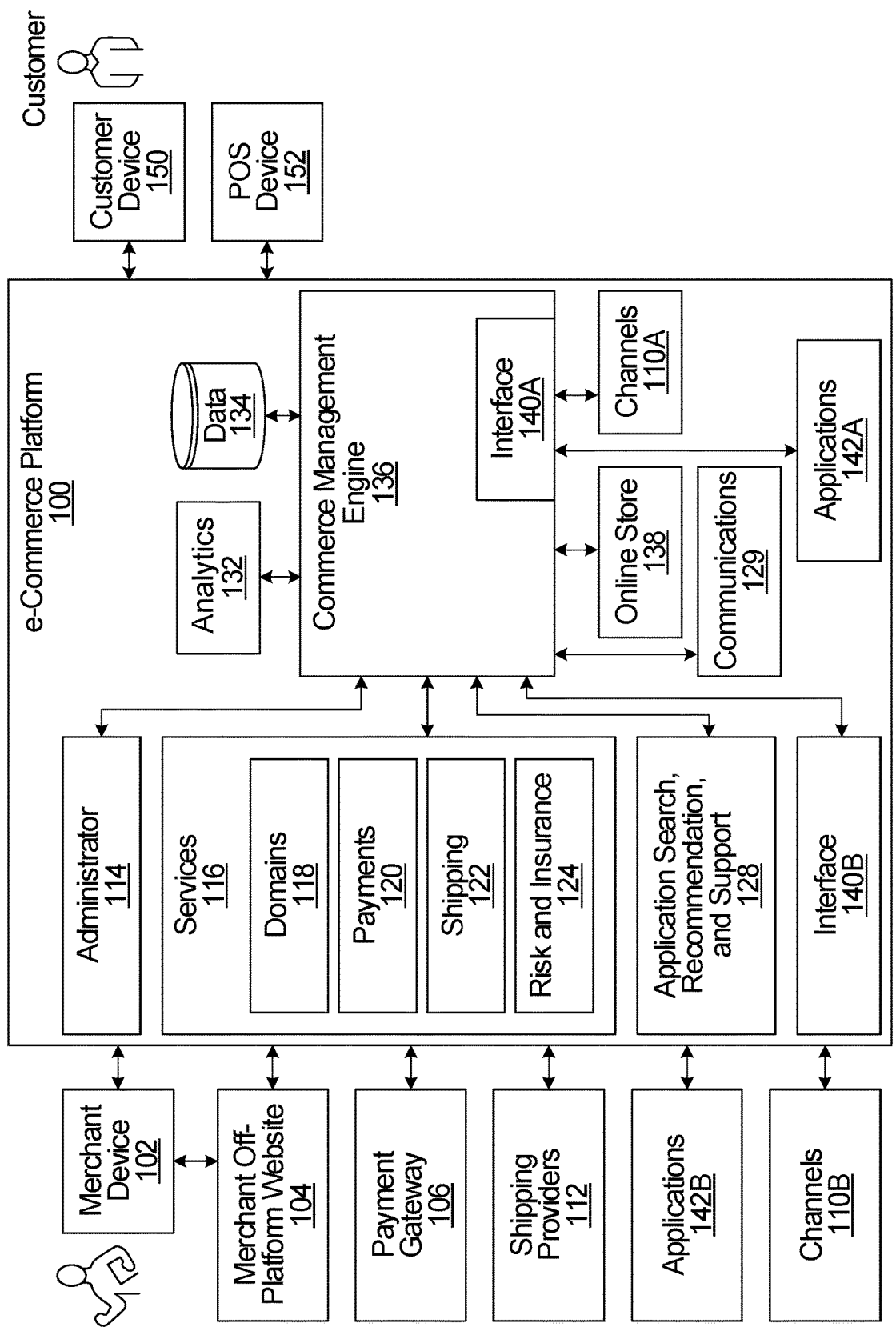
FIG. 8 is a block diagram of the e-commerce platform of FIG. 7 in accordance with one embodiment.

FIG. 8 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 8, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 9 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 9. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 8, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date based ledger that records sale related events that happened to an item).

Conclusion

While specific embodiments have been described and illustrated, such embodiments should be considered illustrative of the subject matter described herein and not as limiting the claims as construed in accordance with the relevant jurisprudence.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Memory, as used herein, may refer to memory that is persistent (e.g., read-only-memory (ROM) or a disk), or memory that is volatile (e.g., random access memory (RAM)). The memory may be distributed, e.g., a same memory may be distributed over one or more servers or locations.

The invention claimed is:

1. A computer-implemented method comprising:
   receiving, by an edge server separate from an origin server, a user request for content from a user device, the user request including a user identifier associated with the user device, wherein the edge server is downstream of the origin server and receives user requests from the user device before the origin server;
   identifying, by the edge server, an experiment key assigned to the user identifier included in the user request, the experiment key associated with an experimental version of the content selected from amongst a plurality of different versions of the content; and
   transmitting, by the edge server, an experiment fetch request to an edge cache to retrieve the experimental version of the content stored in the edge cache, the experiment fetch request providing the experiment key.

2. The computer-implemented method of claim 1, further comprising:
   receiving, by the edge server, an indication that the experimental version of the content is not stored in the edge cache; and
   transmitting, by the edge server, the experiment fetch request to the origin server to retrieve the experimental version of the content from the origin server in response to the indication.

3. The computer-implemented method of claim 2, further comprising:
   receiving, by the edge server, the experimental version of the content from the origin server;
   storing, by the edge server, the experimental version of the content received from the origin server in the edge cache in association with the experiment key; and
   delivering, by the edge server, the experimental version of the content received from the origin server to the user device.

4. The computer-implemented method of claim 2, further comprising:
   receiving, by the edge server, an indication that the experimental version of the content cannot be retrieved from the origin server; and
   transmitting, by the edge server, a control fetch request to at least one of the origin server or the edge cache to retrieve a control version of the content.

5. The computer-implemented method of claim 2, further comprising:
   receiving, by the edge server, a stale indication that the experimental version of the content stored in the edge cache is an expired copy of the experimental version of the content;
   delivering, by the edge server, the expired copy of the experimental version of the content to the user device; and
   requesting, by the edge server, an active copy of the experimental version of the content from the origin server.

6. The computer-implemented method of claim 5, further comprising:
   in response to receiving the active copy of the experimental version of the content from the origin server, storing, by the edge server, the active copy of the experimental version of the content in the edge cache and in association with the experiment key.

7. The computer-implemented method of claim 1, further comprising:
   receiving, by the edge server, an indication that the experimental version of the content is not stored in the edge cache; and
   rendering, by the edge server, the experimental version of the content based on data stored in a database in response to the indication, wherein the database is separate from the origin server and in communication with the edge server.

8. The computer-implemented method of claim 7, further comprising:
   storing, by the edge server, the experimental version of the content rendered by the edge server in the edge cache and in association with the experiment key; and
   delivering, by the edge server, the experimental version of the content rendered by the edge server to the user device.

9. The computer-implemented method of claim 7, further comprising:
   in response to an indication that the experimental version of the content cannot be rendered at the edge server, transmitting, by the edge server, a control fetch request to at least one of the origin server or the edge cache to retrieve a control version of the content.

10. The computer-implemented method of claim 7, further comprising:
receiving, by the edge server, a stale indication that the experimental version of the content stored in the edge cache is an expired copy of the experimental version of the content;
delivering, by the edge server, the expired copy of the experimental version of the content to the user device; and
rendering, by the edge server, an active copy of the experimental version of the content based on the data stored in the database.

11. The computer-implemented method of claim 1, further comprising:
receiving, by the edge server, a hit indication that the experimental version of the content requested by the user request is stored in the edge cache and is an active copy of the experimental version of the content; and
delivering, by the edge server, the active copy of the experimental version of the content to the user device.

12. The computer-implemented method of claim 1, wherein the plurality of different versions of the content comprises a plurality of different experimental versions of the content, the edge cache stores the plurality of different experimental versions of the content, each experimental version of the plurality of different experimental versions of the content is associated with a respective different experiment key of a plurality of experiment keys, wherein the experimental version of the content comprises a first experimental version of the content of the plurality of different experimental versions of the content and the experiment key comprises a first experiment key of the plurality of experiment keys.

13. The computer-implemented method of claim 12, wherein the edge cache further stores a control version of the content, wherein the control version of the content is not associated with any experiment key of the plurality of experiment keys.

14. The computer-implemented method of claim 12, wherein the user device is a first user device, the user request is a first user request, the user identifier is a first user identifier, and the experiment fetch request is a first experiment fetch request, and the method further comprises:
identifying, by the edge server, a second experiment key for a second user request for the content from a second user device, wherein the second user request comprises a second user identifier associated with the second user device; and
transmitting, by the edge server, a second experiment fetch request including the second experiment key to the edge cache to retrieve a second experimental version of the content stored in the edge cache.

15. The computer-implemented method of claim 1, wherein the user device is a first user device, the user request is a first user request, and the user identifier is a first user identifier, and the method further comprises:
identifying, by the edge server, the experiment key for a second user request for the content from a second user device, wherein the second user request comprises a second user identifier associated with the second user device; and
transmitting, by the edge server, the experiment fetch request including the experiment key to the edge cache to retrieve the experimental version of the content for delivery to the second user device.

16. The computer-implemented method of claim 1, further comprising:
storing, by the edge server, the user identifier in association with the experiment key; and
delivering the experimental version of the content to the user device in response to at least one further instance of the user request for the content from the user device.

17. A system comprising:
at least one processor of an edge server separate from an origin server, wherein the edge server is downstream of the origin server and receives user requests from the user device before the origin server; and
a memory storing processor-executable instructions that, when executed, cause the at least one processor to:
receive a user request for content from a user device, the user request including a user identifier associated with the user device;
identify an experiment key assigned to the user identifier included in the user request, the experiment key associated with an experimental version of the content selected from amongst a plurality of different versions of the content; and
transmit an experiment fetch request to an edge cache to retrieve the experimental version of the content stored in the edge cache, the experiment fetch request providing the experiment key.

18. The system of claim 17, wherein the memory further stores processor-executable instructions that, when executed, cause the at least one processor to:
receive an indication that the experimental version of the content is not stored in the edge cache; and
transmit the experiment fetch request to the origin server to retrieve the experimental version of the content from the origin server in response to the indication or render the experimental version of the content based on data stored in a database in response to the indication, wherein the database is separate from the origin server and in communication with the at least one processor.

19. The system of claim 18, wherein the memory further stores processor-executable instructions that, when executed, cause the at least one processor to:
receive an indication that the experimental version of the content cannot be retrieved from the origin server or rendered by the at least one processor; and
transmit a control fetch request to at least one of the origin server or the edge cache to retrieve a control version of the content.

20. The system of claim 17, wherein the plurality of different versions of the content comprises a plurality of different experimental versions of the content, the edge cache stores the plurality of different experimental versions of the content, each experimental version of the plurality of different experimental versions of the content is associated with a respective different experiment key of a plurality of experiment keys, wherein the experimental version of the content comprises a first experimental version of the content of the plurality of different experimental versions of the content and the experiment key comprises a first experiment key of the plurality of experiment keys.

21. The system of claim 20, wherein the edge cache further stores a control version of the content, wherein the control version of the content is not associated with any experiment key of the plurality of experiment keys.

22. A non-transitory computer-readable storage medium having stored thereon computer-executable instruction that, when executed, cause a processor of an edge server separate from an origin server to perform operations, wherein the edge server is downstream of the origin server and receives user requests from the user device before the origin server, and wherein the operations comprise:
- receiving a user request for content from a user device, the user request including a user identifier associated with the user device;
- identifying an experiment key assigned to the user identifier included in the user request, the experiment key associated with an experimental version of the content selected from amongst a plurality of different versions of the content; and
- transmitting an experiment fetch request to an edge cache to retrieve the experimental version of the content stored in the edge cache, the experiment fetch request providing the experiment key.

* * * * *

UNITED STATES PATENT AND TRADEMARK OFFICE
CERTIFICATE OF CORRECTION

PATENT NO. : 12,177,501 B2
APPLICATION NO. : 18/326206
DATED : December 24, 2024
INVENTOR(S) : Juliano Julio Costa et al.

Page 1 of 1

It is certified that error appears in the above-identified patent and that said Letters Patent is hereby corrected as shown below:

On the Title Page

Under Item (73) Assignee:
"SHIPIFY INC., Ottawa (CA)" should be -- SHOPIFY INC., Ottawa (CA) --

Signed and Sealed this
Fourth Day of February, 2025

Coke Morgan Stewart
*Acting Director of the United States Patent and Trademark Office*